(12) United States Patent
Sasaki et al.

(10) Patent No.: US 6,351,317 B1
(45) Date of Patent: Feb. 26, 2002

(54) PRINTING SYSTEM USING COMMUNICATION NETWORK

(75) Inventors: Hiroyuki Sasaki; Masashi Kuno, both of Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/161,288

(22) Filed: Sep. 28, 1998

(30) Foreign Application Priority Data

Sep. 30, 1997 (JP) .............................. 9-284706
Sep. 30, 1997 (JP) .............................. 9-284709

(51) Int. Cl.[7] .............................................. G06F 15/00
(52) U.S. Cl. ..................... 358/1.15; 358/1.12; 358/453; 358/1.9; 707/527
(58) Field of Search .......................... 358/1.1, 1.5, 1.6, 358/1.9, 1.12, 1.13, 1.14, 1.15, 448, 452, 453; 348/14.12, 228, 222, 63, 333.12; 345/629, 660; 707/526, 527

(56) References Cited

U.S. PATENT DOCUMENTS 5,675,717 A * 10/1997 Yamamoto .................. 358/1.9
5,933,137 A * 8/1999 Anderson .................... 345/328

* cited by examiner

Primary Examiner—Mark Wallerson
(74) Attorney, Agent, or Firm—Oliff & Berridge, PLC

(57) ABSTRACT

A printing system has at least one data processing apparatus for generating data to form an image and a printing apparatus for printing the image. The data processing apparatus and the printing apparatus are connected with each other via a network. The data processing apparatus has: a generating device for generating print command data, which includes a plurality of commands to form the image; a print command data sending device for sending the generated print command data to the printing apparatus; a dot data receiving device for receiving dot data from the printing apparatus; a preview image forming device for forming a preview image by using the received dot data; and a displaying device for displaying the preview image. The printing apparatus has: a print command data receiving device for receiving the print command data from the data processing apparatus; a converting device for converting the received print command data into print data, which includes a plurality of the dot data each of which corresponds to a different dot of the image; a first extracting device for extracting a first part of the dot data from the print data; and a dot data sending device for sending the extracted dot data to the data processing apparatus via the network.

13 Claims, 17 Drawing Sheets

FIG. 6

|  | X1 | X2 | X3 | X4 | X5 | X6 | X7 | X8 | X9 | X10 | X11 | X12 | X13 | X14 | X15 | X16 |
|---|---|---|---|---|---|---|---|---|---|---|---|---|---|---|---|---|
| Y1 | 1 | 2 | 3 | 4 | 5 | 6 | 7 | 8 | 9 | 10 | 11 | 12 | 13 | 14 | 15 | 16 |
| Y2 | 17 | 18 | 19 | 20 | 21 | 22 | 23 | 24 | 25 | 26 | 27 | 28 | 29 | 30 | 31 | 32 |
| Y3 | 33 | 34 | 35 | 36 | 37 | 38 | 39 | 40 | 41 | 42 | 43 | 44 | 45 | 46 | 47 | 48 |
| Y4 | 49 | 50 | 51 | 52 | 53 | 54 | 55 | 56 | 57 | 58 | 59 | 60 | 61 | 62 | 63 | 64 |
| Y5 | 65 | 66 | 67 | 68 | 69 | 70 | 71 | 72 | 73 | 74 | 75 | 76 | 77 | 78 | 79 | 80 |
| Y6 | 81 | 82 | 83 | 84 | 85 | 86 | 87 | 88 | 89 | 90 | 91 | 92 | 93 | 94 | 95 | 96 |
| Y7 | 97 | 98 | 99 | 100 | 101 | 102 | 103 | 104 | 105 | 106 | 107 | 108 | 109 | 110 | 111 | 112 |
| Y8 | 113 | 114 | 115 | 116 | 117 | 118 | 119 | 120 | 121 | 122 | 123 | 124 | 125 | 126 | 127 | 128 |
| Y9 | 129 | 130 | 131 | 132 | 133 | 134 | 135 | 136 | 137 | 138 | 139 | 140 | 141 | 142 | 143 | 144 |
| Y10 | 145 | 146 | 147 | 148 | 149 | 150 | 151 | 152 | 153 | 154 | 155 | 156 | 157 | 158 | 159 | 160 |
| Y11 | 161 | 162 | 163 | 164 | 165 | 166 | 167 | 168 | 169 | 170 | 171 | 172 | 173 | 174 | 175 | 176 |
| Y12 | 177 | 178 | 179 | 180 | 181 | 182 | 183 | 184 | 185 | 186 | 187 | 188 | 189 | 190 | 191 | 192 |
| Y13 | 193 | 194 | 195 | 196 | 197 | 198 | 199 | 200 | 201 | 202 | 203 | 204 | 205 | 206 | 207 | 208 |
| Y14 | 209 | 210 | 211 | 212 | 213 | 214 | 215 | 216 | 217 | 218 | 219 | 220 | 221 | 222 | 223 | 224 |
| Y15 | 225 | 226 | 227 | 228 | 229 | 230 | 231 | 232 | 233 | 234 | 235 | 236 | 237 | 238 | 239 | 240 |
| Y16 | 241 | 242 | 243 | 244 | 245 | 246 | 247 | 248 | 249 | 250 | 251 | 252 | 253 | 254 | 255 | 256 |

FIG. 7

|     | X1 | X2 | X3 | X4 | X5 | X6 | X7 | X8 | X9 | X10 | X11 | X12 | X13 | X14 | X15 | X16 |
|-----|----|----|----|----|----|----|----|----|----|-----|-----|-----|-----|-----|-----|-----|
| Y1  | 1 | 1 | 1 | 1 | 1 | 1 | 1 | 1 | 9 | 9 | 9 | 9 | 9 | 9 | 9 | 9 |
| Y2  | 1 | 1 | 1 | 1 | 1 | 1 | 1 | 1 | 9 | 9 | 9 | 9 | 9 | 9 | 9 | 9 |
| Y3  | 1 | 1 | 1 | 1 | 1 | 1 | 1 | 1 | 9 | 9 | 9 | 9 | 9 | 9 | 9 | 9 |
| Y4  | 1 | 1 | 1 | 1 | 1 | 1 | 1 | 1 | 9 | 9 | 9 | 9 | 9 | 9 | 9 | 9 |
| Y5  | 1 | 1 | 1 | 1 | 1 | 1 | 1 | 1 | 9 | 9 | 9 | 9 | 9 | 9 | 9 | 9 |
| Y6  | 1 | 1 | 1 | 1 | 1 | 1 | 1 | 1 | 9 | 9 | 9 | 9 | 9 | 9 | 9 | 9 |
| Y7  | 1 | 1 | 1 | 1 | 1 | 1 | 1 | 1 | 9 | 9 | 9 | 9 | 9 | 9 | 9 | 9 |
| Y8  | 1 | 1 | 1 | 1 | 1 | 1 | 1 | 1 | 9 | 9 | 9 | 9 | 9 | 9 | 9 | 9 |
| Y9  | 129 | 129 | 129 | 129 | 129 | 129 | 129 | 129 | 137 | 137 | 137 | 137 | 137 | 137 | 137 | 137 |
| Y10 | 129 | 129 | 129 | 129 | 129 | 129 | 129 | 129 | 137 | 137 | 137 | 137 | 137 | 137 | 137 | 137 |
| Y11 | 129 | 129 | 129 | 129 | 129 | 129 | 129 | 129 | 137 | 137 | 137 | 137 | 137 | 137 | 137 | 137 |
| Y12 | 129 | 129 | 129 | 129 | 129 | 129 | 129 | 129 | 137 | 137 | 137 | 137 | 137 | 137 | 137 | 137 |
| Y13 | 129 | 129 | 129 | 129 | 129 | 129 | 129 | 129 | 137 | 137 | 137 | 137 | 137 | 137 | 137 | 137 |
| Y14 | 129 | 129 | 129 | 129 | 129 | 129 | 129 | 129 | 137 | 137 | 137 | 137 | 137 | 137 | 137 | 137 |
| Y15 | 129 | 129 | 129 | 129 | 129 | 129 | 129 | 129 | 137 | 137 | 137 | 137 | 137 | 137 | 137 | 137 |
| Y16 | 129 | 129 | 129 | 129 | 129 | 129 | 129 | 129 | 137 | 137 | 137 | 137 | 137 | 137 | 137 | 137 |

|     | X1 | X2 | X3 | X4 | X5 | X6 | X7 | X8 | X9 | X10 | X11 | X12 | X13 | X14 | X15 | X16 |
|-----|----|----|----|----|----|----|----|----|----|----|----|----|----|----|----|----|
| Y1  | 1  | 1  | 1  | 1  | 5  | 5  | 5  | 5  | 9  | 9  | 9  | 9  | 9  | 9  | 9  | 9  |
| Y2  | 1  | 1  | 1  | 1  | 5  | 5  | 5  | 5  | 9  | 9  | 9  | 9  | 9  | 9  | 9  | 9  |
| Y3  | 1  | 1  | 1  | 1  | 5  | 5  | 5  | 5  | 9  | 9  | 9  | 9  | 9  | 9  | 9  | 9  |
| Y4  | 1  | 1  | 1  | 1  | 5  | 5  | 5  | 5  | 9  | 9  | 9  | 9  | 9  | 9  | 9  | 9  |
| Y5  | 65 | 65 | 65 | 65 | 69 | 69 | 69 | 69 | 9  | 9  | 9  | 9  | 9  | 9  | 9  | 9  |
| Y6  | 65 | 65 | 65 | 65 | 69 | 69 | 69 | 69 | 9  | 9  | 9  | 9  | 9  | 9  | 9  | 9  |
| Y7  | 65 | 65 | 65 | 65 | 69 | 69 | 69 | 69 | 9  | 9  | 9  | 9  | 9  | 9  | 9  | 9  |
| Y8  | 65 | 65 | 65 | 65 | 69 | 69 | 69 | 69 | 9  | 9  | 9  | 9  | 9  | 9  | 9  | 9  |
| Y9  | 129 | 129 | 129 | 129 | 129 | 129 | 129 | 129 | 137 | 137 | 137 | 137 | 137 | 137 | 137 | 137 |
| Y10 | 129 | 129 | 129 | 129 | 129 | 129 | 129 | 129 | 137 | 137 | 137 | 137 | 137 | 137 | 137 | 137 |
| Y11 | 129 | 129 | 129 | 129 | 129 | 129 | 129 | 129 | 137 | 137 | 137 | 137 | 137 | 137 | 137 | 137 |
| Y12 | 129 | 129 | 129 | 129 | 129 | 129 | 129 | 129 | 137 | 137 | 137 | 137 | 137 | 137 | 137 | 137 |
| Y13 | 129 | 129 | 129 | 129 | 129 | 129 | 129 | 129 | 137 | 137 | 137 | 137 | 137 | 137 | 137 | 137 |
| Y14 | 129 | 129 | 129 | 129 | 129 | 129 | 129 | 129 | 137 | 137 | 137 | 137 | 137 | 137 | 137 | 137 |
| Y15 | 129 | 129 | 129 | 129 | 129 | 129 | 129 | 129 | 137 | 137 | 137 | 137 | 137 | 137 | 137 | 137 |
| Y16 | 129 | 129 | 129 | 129 | 129 | 129 | 129 | 129 | 137 | 137 | 137 | 137 | 137 | 137 | 137 | 137 |

|     | X1 | X2 | X3 | X4 | X5 | X6 | X7 | X8 | X9 | X10 | X11 | X12 | X13 | X14 | X15 | X16 |
|-----|----|----|----|----|----|----|----|----|----|-----|-----|-----|-----|-----|-----|-----|
| Y1  | 1  | 1  | 3  | 3  | 5  | 5  | 7  | 7  | 9  | 9   | 9   | 9   | 9   | 9   | 9   | 9   |
| Y2  | 1  | 1  | 3  | 3  | 5  | 5  | 7  | 7  | 9  | 9   | 9   | 9   | 9   | 9   | 9   | 9   |
| Y3  | 33 | 33 | 35 | 35 | 37 | 37 | 39 | 39 | 9  | 9   | 9   | 9   | 9   | 9   | 9   | 9   |
| Y4  | 33 | 33 | 35 | 35 | 37 | 37 | 39 | 39 | 9  | 9   | 9   | 9   | 9   | 9   | 9   | 9   |
| Y5  | 65 | 65 | 67 | 67 | 69 | 69 | 71 | 71 | 9  | 9   | 9   | 9   | 9   | 9   | 9   | 9   |
| Y6  | 65 | 65 | 67 | 67 | 69 | 69 | 71 | 71 | 9  | 9   | 9   | 9   | 9   | 9   | 9   | 9   |
| Y7  | 97 | 97 | 99 | 99 | 101| 101| 103| 103| 9  | 9   | 9   | 9   | 9   | 9   | 9   | 9   |
| Y8  | 97 | 97 | 99 | 99 | 101| 101| 103| 103| 9  | 9   | 9   | 9   | 9   | 9   | 9   | 9   |
| Y9  | 129| 129| 129| 129| 129| 129| 129| 129| 137| 137 | 137 | 137 | 137 | 137 | 137 | 137 |
| Y10 | 129| 129| 129| 129| 129| 129| 129| 129| 137| 137 | 137 | 137 | 137 | 137 | 137 | 137 |
| Y11 | 129| 129| 129| 129| 129| 129| 129| 129| 137| 137 | 137 | 137 | 137 | 137 | 137 | 137 |
| Y12 | 129| 129| 129| 129| 129| 129| 129| 129| 137| 137 | 137 | 137 | 137 | 137 | 137 | 137 |
| Y13 | 129| 129| 129| 129| 129| 129| 129| 129| 137| 137 | 137 | 137 | 137 | 137 | 137 | 137 |
| Y14 | 129| 129| 129| 129| 129| 129| 129| 129| 137| 137 | 137 | 137 | 137 | 137 | 137 | 137 |
| Y15 | 129| 129| 129| 129| 129| 129| 129| 129| 137| 137 | 137 | 137 | 137 | 137 | 137 | 137 |
| Y16 | 129| 129| 129| 129| 129| 129| 129| 129| 137| 137 | 137 | 137 | 137 | 137 | 137 | 137 |

| | X1 | X2 | X3 | X4 | X5 | X6 | X7 | X8 | X9 | X10 | X11 | X12 | X13 | X14 | X15 | X16 |
|---|---|---|---|---|---|---|---|---|---|---|---|---|---|---|---|---|
| Y1 | 1 | 2 | 3 | 4 | 5 | 6 | 7 | 8 | 9 | 9 | 9 | 9 | 9 | 9 | 9 | 9 |
| Y2 | 17 | 18 | 19 | 20 | 21 | 22 | 23 | 24 | 9 | 9 | 9 | 9 | 9 | 9 | 9 | 9 |
| Y3 | 33 | 34 | 35 | 36 | 37 | 38 | 39 | 40 | 9 | 9 | 9 | 9 | 9 | 9 | 9 | 9 |
| Y4 | 49 | 50 | 51 | 52 | 53 | 54 | 55 | 56 | 9 | 9 | 9 | 9 | 9 | 9 | 9 | 9 |
| Y5 | 65 | 66 | 67 | 68 | 69 | 70 | 71 | 72 | 9 | 9 | 9 | 9 | 9 | 9 | 9 | 9 |
| Y6 | 81 | 82 | 83 | 84 | 85 | 86 | 87 | 88 | 9 | 9 | 9 | 9 | 9 | 9 | 9 | 9 |
| Y7 | 97 | 98 | 99 | 100 | 101 | 102 | 103 | 104 | 9 | 9 | 9 | 9 | 9 | 9 | 9 | 9 |
| Y8 | 113 | 114 | 115 | 116 | 117 | 118 | 119 | 120 | 9 | 9 | 9 | 9 | 9 | 9 | 9 | 9 |
| Y9 | 129 | 129 | 129 | 129 | 129 | 129 | 129 | 129 | 137 | 137 | 137 | 137 | 137 | 137 | 137 | 137 |
| Y10 | 129 | 129 | 129 | 129 | 129 | 129 | 129 | 129 | 137 | 137 | 137 | 137 | 137 | 137 | 137 | 137 |
| Y11 | 129 | 129 | 129 | 129 | 129 | 129 | 129 | 129 | 137 | 137 | 137 | 137 | 137 | 137 | 137 | 137 |
| Y12 | 129 | 129 | 129 | 129 | 129 | 129 | 129 | 129 | 137 | 137 | 137 | 137 | 137 | 137 | 137 | 137 |
| Y13 | 129 | 129 | 129 | 129 | 129 | 129 | 129 | 129 | 137 | 137 | 137 | 137 | 137 | 137 | 137 | 137 |
| Y14 | 129 | 129 | 129 | 129 | 129 | 129 | 129 | 129 | 137 | 137 | 137 | 137 | 137 | 137 | 137 | 137 |
| Y15 | 129 | 129 | 129 | 129 | 129 | 129 | 129 | 129 | 137 | 137 | 137 | 137 | 137 | 137 | 137 | 137 |
| Y16 | 129 | 129 | 129 | 129 | 129 | 129 | 129 | 129 | 137 | 137 | 137 | 137 | 137 | 137 | 137 | 137 |

P5

US 6,351,317 B1

PRINTING SYSTEM USING COMMUNICATION NETWORK

BACKGROUND OF THE INVENTION

1. Field of the Invention

The present invention relates to a printing system having a plurality of computers and printer, which are connected with each other via a communication network.

2. Description of the Related Art

In a printing system having a plurality of computers and a printer, the computers are connected with the printer via a local network. The computer user creates a document and/or an image by using the computer. The computer generates document data and/or image data corresponding to the document and/or the image, and sends them to the printer via the local network. The printer receives the document data and/or the image data, and then converts these data to print data (e.g., bitmap data), and then prints the print data onto a printing medium such as printing paper.

Such a printing system has a preview function. If the computer user wishes to confirm the content of the document and/or the image to be actually printed by the printer before printing, the computer user can view a preview image corresponding to the document and/or the image with a display device of the computer such as a CRT display. To accomplish the preview function, the printer generates the preview image data and sends it to the computer via the local network. The computer receives the preview image data, and display the preview image corresponding to the received preview image data.

Such a printing system using the local network has a disadvantage that velocity of the communication becomes slow when a large number of computers simultaneously communicate with the printer. Image data such as preview image data generally has a large size. Therefore, if the local network is crowded, it takes a long time to send preview image data from the printer to the computer via the local network. If the resolution of the preview image is reduced, the size of the preview image data is also reduced. Therefore, it is possible to reduce the length of time required to send the preview image data from the printer to the computer. However, if the resolution of the preview image is reduced, the computer user cannot confirm the detail of the image.

In recent years, an internet-becomes widespread. Document data and image data can be sent from one computer to another computer via the internet. Further, document data :and image data can be directly sent from one computer to a printer via the internet However, if communication lines of the internet are crowded, velocity of the communication on the internet becomes slow. In this case, it takes a long time to send document data and image data via the internet. Especially, the size of image data is relatively large. Therefore if communication lines of the internet are crowded, the length of time necessary for sending the image data becomes extremely long.

Further, in the printing system wherein a single printer is shared with a plurality of computers, the printer manages a plurality of print jobs, and the printer carries out a printing process for each print job. In such a printer, when the communication lines of the internet are crowded, if the printer executes a print job which requests that the printer directly receives image data from a computer via the internet and directly prints images corresponding to image data, it takes a long time for the printer to finish this job. Therefore, execution of another print job are delayed.

SUMMARY OF THE INVENTION

It is therefore a first object of the present invention to provide a printing system which can send data to form a preview image from a printing apparatus to a data processing apparatus via a network in a short time.

It is a second object of the present invention to provide a printing system which can change resolution of a preview image.

The above mentioned first object can be achieved by a printing system of the present invention. The printing system of the present invention has at least one data processing apparatus for generating data to form an image and a printing apparatus for printing the image. The data processing apparatus and the printing apparatus are connected with each other via a network. The data processing apparatus has: a generating device for generating print command data, which includes a plurality of commands to form the image to be printed; a print command data sending device for sending the generated print command data to the printing apparatus; a dot data receiving device for receiving dot data from the printing apparatus; a preview image forming device for forming a preview image by using the received dot data; and a displaying device for displaying the preview image. The printing apparatus has: a print command data receiving device for receiving the print command data from the data processing apparatus; a converting device for converting the received print command data into print data, which includes a plurality of the dot data each of which corresponds to a different dot of the image to be printed; a first extracting device for extracting a first part of the dot data included in the print data; and a dot data sending device for sending the extracted dot data to the data processing apparatus via the network.

In the data processing apparatus, the generating device generates print command data. The print command data includes a plurality of commands to form an image to be printed. Next, the print command sending device sends the print command data to the printing apparatus.

Next, in the printing apparatus, the print command data receiving device receives the print command data from the data processing apparatus. Next, the converting device converts the received print command data into print data. The print data includes a plurality of dot data each of which corresponds to a different dot of the image to be printed. Next, the first extracting device extracts a first part of the dot data included in the print data. That is, the first extracting device extracts the dot data corresponding to specified dots of the image to be printed. Next, the dot data sending device sends the extracted dot data, i.e., the first part of the dot data to the data processing apparatus via the network. As the total amount of the first part of the dot data is smaller than the total amount of all of the dot data included in the print data, the dot data sending device can send the first part of the dot data in a short time, as compared with sending all of the dot data included in the print data.

Next, in the data processing apparatus, the dot data receiving device receives the dot data from the printing apparatus. Next, the preview image forming device forms a preview image by using the received dot data. Next, the displaying device displays the preview image. The preview image shows the image to be printed. The user can confirm the content and the condition of the image by viewing the preview image.

When the first extracting device extracts the first part of the dot data from the print data, the first extracting device may divide the print data into a plurality of groups, each of which has a predetermined amount of the dot data, and extract a part of the dot data included in each group. This means that the first extracting device may divide the image into a plurality of areas, each of which has a predetermined number of dots, and extracts the dot data corresponding to a part of dots existing in the area. By using the dot data extracted in this manner, the preview image forming device can form a preview image which represents the image to be printed in low resolution.

The above mentioned second object can be achieved by a printing system of the present invention. Like the aforementioned printing system, this printing system has a data processing apparatus and a printing apparatus. The data processing apparatus includes the same devices as the aforementioned data processing apparatus, and further includes a request command sending device for sending a request command to the printing apparatus. The printing apparatus includes the same devices as the aforementioned printing apparatus, and further includes: a request command receiving device for receiving the request command from the data processing apparatus; and a second extracting device for extracting a second part of the dot data included in the print data in response to the received request command.

As mentioned above, in the data processing apparatus, the preview image is formed by using the first part of the dot data. After this preview image is formed, the request command sending device of the data processing apparatus sends a request command to the printing apparatus.

Next, in the printing apparatus, the request command receiving device receives the request command from the data processing apparatus. In response to the reception of the request command, the second extracting device extracts a second part of the dot data included in the print data. The aforementioned first extracting device extracts the first part of the dot data from the print data, while the second extracting device extracts the second part of the dot data from the same print data. The second part is different from the first part. Namely, the second extracting device extracts dot data corresponding to dots which is different from dots corresponding to dot data extracted by the first extracting device. Next, the extracted second part of the dot data is sent from the printing apparatus to the data processing apparatus.

Next, in the data processing apparatus, the second part of the dot data is received. Next, a preview image is formed by using the first part of the dot data, which has been previously received, and the second part of the dot data, which has been now received, and it is displayed. As the preview image is formed by using the first part of the dot data and the second part of the dot data, resolution of the preview image can be increased. Further, by using the first part of the dot data and the second part of the dot data, the magnification of the preview image can be formed.

Thus, by viewing the preview image formed by only using the first part of the dot data, the user can confirm the outline of the image to be printed. Further, by viewing the preview image formed by using both the first part of the dot data and the second part of the dot data, the user can confirm the detail of the image to be printed.

The above mentioned first object can be also achieved by a printing system of the present invention. The printing system of the present invention has at least one data processing apparatus and a printing apparatus, which are connected with each other via a network. Like the aforementioned data processing apparatus, this data processing apparatus also has: a generating device; a print command data sending device; a dot data receiving device; a preview image forming device; and a displaying device. This data processing apparatus further has: a measuring device for measuring velocity of a reception of the dot data from the printing apparatus; and a request command sending device for sending a request command to the printing apparatus if the measured velocity is slower than a predetermined velocity. Like the aforementioned printing apparatus, this printing apparatus also has: a print command data receiving device; a converting device; a first extracting device; and a dot data sending device. This printing apparatus further has: a request command receiving device for receiving the request command from the data processing apparatus; and a second extracting device for extracting a second part of the dot data included in the print data in response to the received request command.

When the data processing process receives the first part of the dot data from the printing apparatus, the measuring device measures velocity of the reception of the first part of the dot data. If the velocity of the reception is slower than a predetermined velocity due to, for example, congestion of the network, the data processing apparatus sends a request command to the printing apparatus. In response to this request command, the printing apparatus extracts a second part of the dot data included in the print data, and sends the extracted second part of the dot data to the data processing apparatus via the network. The data processing apparatus receives the second part of the dot data, and forms the preview image by using the second part of the dot data, and displays the formed preview image on the display device of the data processing apparatus. If the amount of the second part of the dot data is smaller than the amount of the first part of the dot data, the velocity of the reception of the second part of the dot data is faster than the velocity of the reception of the first part of the dot data. Thus, it is possible to send the dot data from the printing apparatus to the data processing apparatus via the network in a short time.

The above mentioned first object can be also achieved by a preview image displaying method of the present invention. The preview image displaying method is used for a printing system having at least one data processing apparatus for generating data to form an image and a printing apparatus for printing the image. The data processing apparatus and the printing apparatus are connected with each other via a network. The preview image displaying method has the processes of: sending the print command data from the data processing apparatus to the printing apparatus; converting the print command data into print data in the printing apparatus; extracting a first part of the dot data from the print data in the printing apparatus; sending the extracted first part of dot data from the printing apparatus to the data processing apparatus via the network; receiving the first part of the dot data from the printing apparatus in the data processing apparatus; forming a preview image by using the received first part of dot data in the data processing apparatus; and displaying the preview image on a display device of the data processing apparatus.

Thus, the first part of the dot data is extracted from the print data, and sent from the printing apparatus to the data processing apparatus via the network. Then, the preview image is formed by using the first part of the dot data. As the total amount of the first part of the dot data is smaller than the total amount of all of the dot data included in the print data, it is possible to send the first part of the dot data from the printing apparatus to the data processing apparatus via the network in a short time, as compared with sending all of the dot data included in the print data.

The above mentioned second object can be also achieved by a preview image displaying method of the present invention. This preview image method includes the same processes as the aforementioned preview image displaying method, and further includes: sending a request command from the data processing apparatus to the printing apparatus, after the preview image is displayed; extracting a second part of the dot data from the print data in the printing apparatus, in response to the received request command; sending the extracted second part of the dot data from the printing apparatus to the data processing apparatus via the network; reforming the preview image by using the first part of the dot data and the second part of the dot data in the data processing apparatus; and displaying the reformed preview image on the display device of the data processing apparatus.

As the preview image is reformed by using the first part of the dot data and the second part of the dot data, resolution of the preview image can be increased. Further, by using the first part of the dot data and the second part of the dot data, the magnification of the preview image can be formed.

Thus, by viewing the preview image formed by only using the first part of the dot data, the user can first confirm the outline of the image to be printed. By viewing the preview image formed by using both the first part of the dot data and the second part of the dot data, the user can next confirm the detail of the image to be printed.

The above mentioned first object can be also achieved by a preview image displaying method of the present invention. This preview image displaying method has the processes of: sending the print command data from the data processing apparatus to the printing apparatus; converting the print command data into print data in the printing apparatus; extracting a first part of the dot data from the print data in the printing apparatus; sending the extracted first part of dot data from the printing apparatus to the data processing apparatus via the network; receiving the first part of the dot data from the printing apparatus; forming a preview image by using the first part of dot data received from the printing apparatus in the data processing apparatus; and displaying the preview image on a display device of the data processing apparatus. This method further has the processes of: measuring velocity of a reception of the first part of the dot data from the printing apparatus in the data processing apparatus when the first part of the dot data is received; sending a request: command from the data processing apparatus to the printing apparatus if the measured velocity is slower than a predetermined velocity; extracting a second part of the dot data included in the print data in the printing apparatus, in response to the received request command; sending the extracted second part of the dot data from the printing apparatus to the data processing apparatus via the network; forming the preview image by using the second part of the dot data in the data processing apparatus; and displaying the preview image formed by using the second part of the dot data on the display device of the data processing apparatus.

In case that the amount of the second part of the dot data is smaller than the amount of the first part of the dot data, the velocity of the reception of the second part of the dot data is faster than the velocity of the reception of the first part of the dot data. Thus, it is possible to send the dot data from the printing apparatus to the data processing apparatus via the network in a short time.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a diagram showing preview data according to the first embodiment;

FIGS. 7 through 10 are diagrams each showing preview display data according to the first embodiment;

DETAILED DESCRIPTION OF THE PREFERRED EMBODIMENTS

Referring to the accompanying the drawings, embodiments of the present invention will be now described. In the description set forth hereinafter, the present invention is embodied in a printing system.

First Embodiment

First, a first embodiment of the present invention will be described with reference to FIGS.1 through 12.

Figure 1:
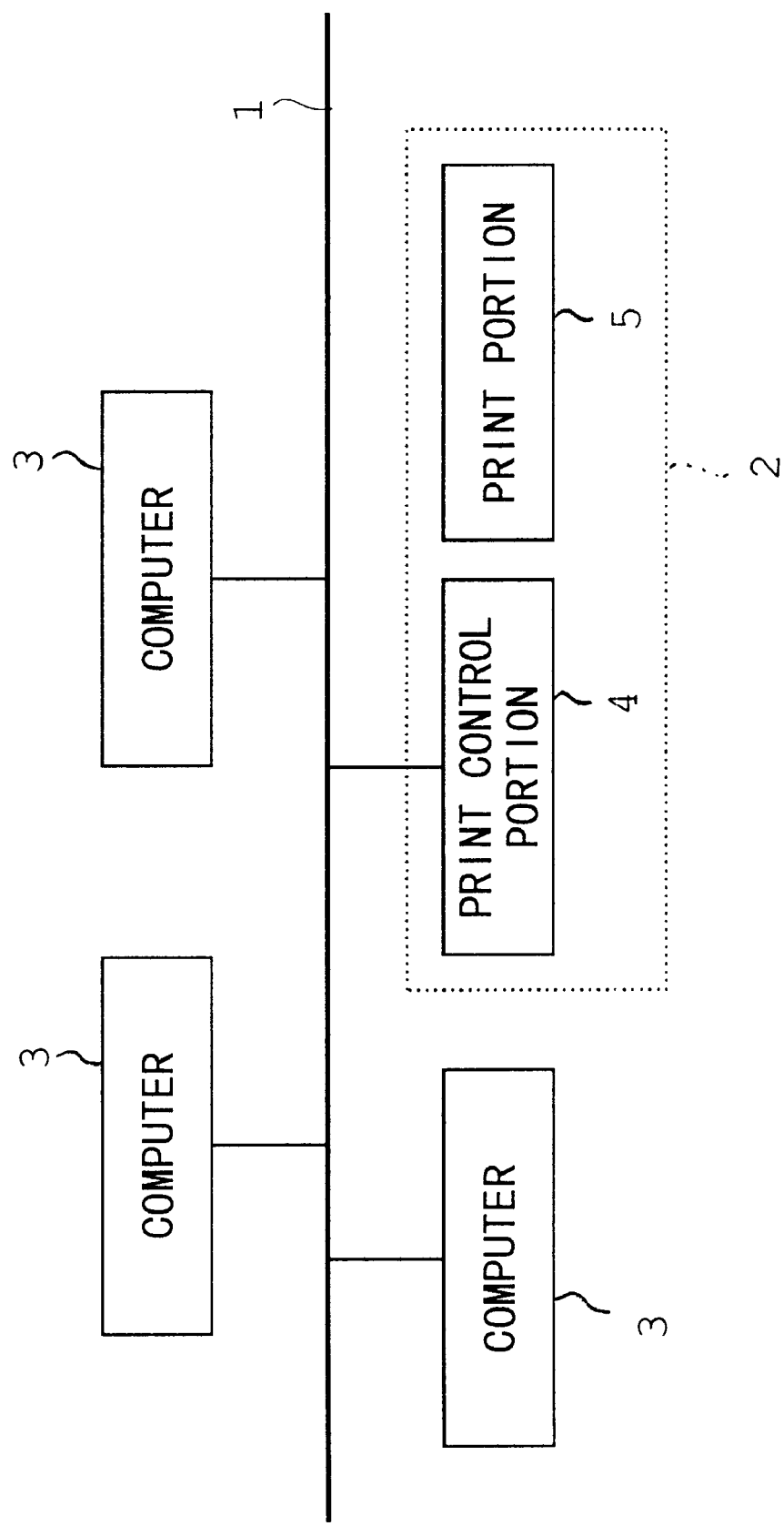
FIG. 1 is a block diagram showing a printing system of a first embodiment of the present invention.

FIG. 1 shows a construction of a printing system 100 of the first embodiment of the present invention. As shown in FIG. 1, the printing system 100 has a number of computers 3 and a printer 2. Both the computers 3 and the printer 2 are connected with a network 1. The computers 3 and the printer 2 can mutually communicate to each other via the network 1. Each computer 3 is, for example, a personal computer.

Figure 2:
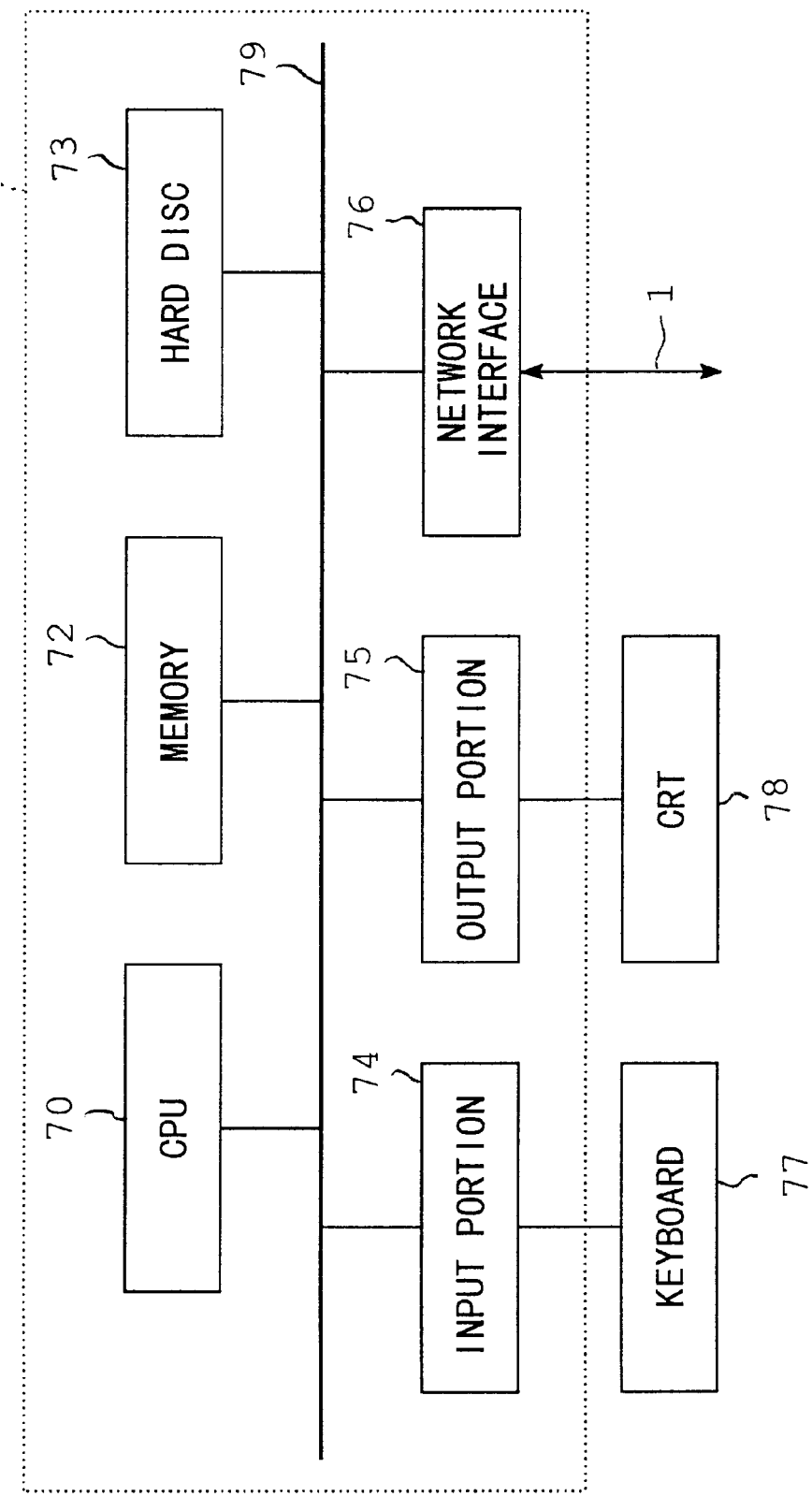
FIG. 2 is a block diagram showing a computer of the printing system according to the first embodiment.

FIG. 2 shows a construction of each computer 3. As shown in FIG. 2, the computer 3 has a CPU 70, a memory 72, a hard disc 73, an input portion 74, an output portion 75 and a network interface 76. These devices and portions are interconnected via a bus 79. Further, a keyboard 77 and a CRT (Cathode Ray Tube) 78 are connected with the computer 3.

The network interface 76 serves as an interface to connect the computer 3 with the network 1. The input portion 74 serves as interfaces to connect external input devices, such as a keyboard 77, a mouse, with the computer 3. The output portion 75 serves as interfaces to connect the external output devices, such as a CRT 78 or another type of display, with the computer 3. The hard disc 73 is storage having a large amount of memory capacity. The hard disc 73 stores programs to be executed by the CPU 70 and other data necessary for the CPU 70 to control the computer 3. Further, the hard disc 73 is used as temporarily memory spaces for storing various data necessary for a word processing process, an image drawing process, a preview process or other processes. The memory 72 is, for example, a DRAM. The memory 72 is used for temporarily storing data to be used for operations of the CPU 70. The CRT 78 is a display device to display documents and images and other information necessary for the computer user. The CPU 70 executes programs stored in the hard disc 73, and controls the computer 3 to perform the word processing process, the image drawing process, the preview process and other processes.

Figure 3:
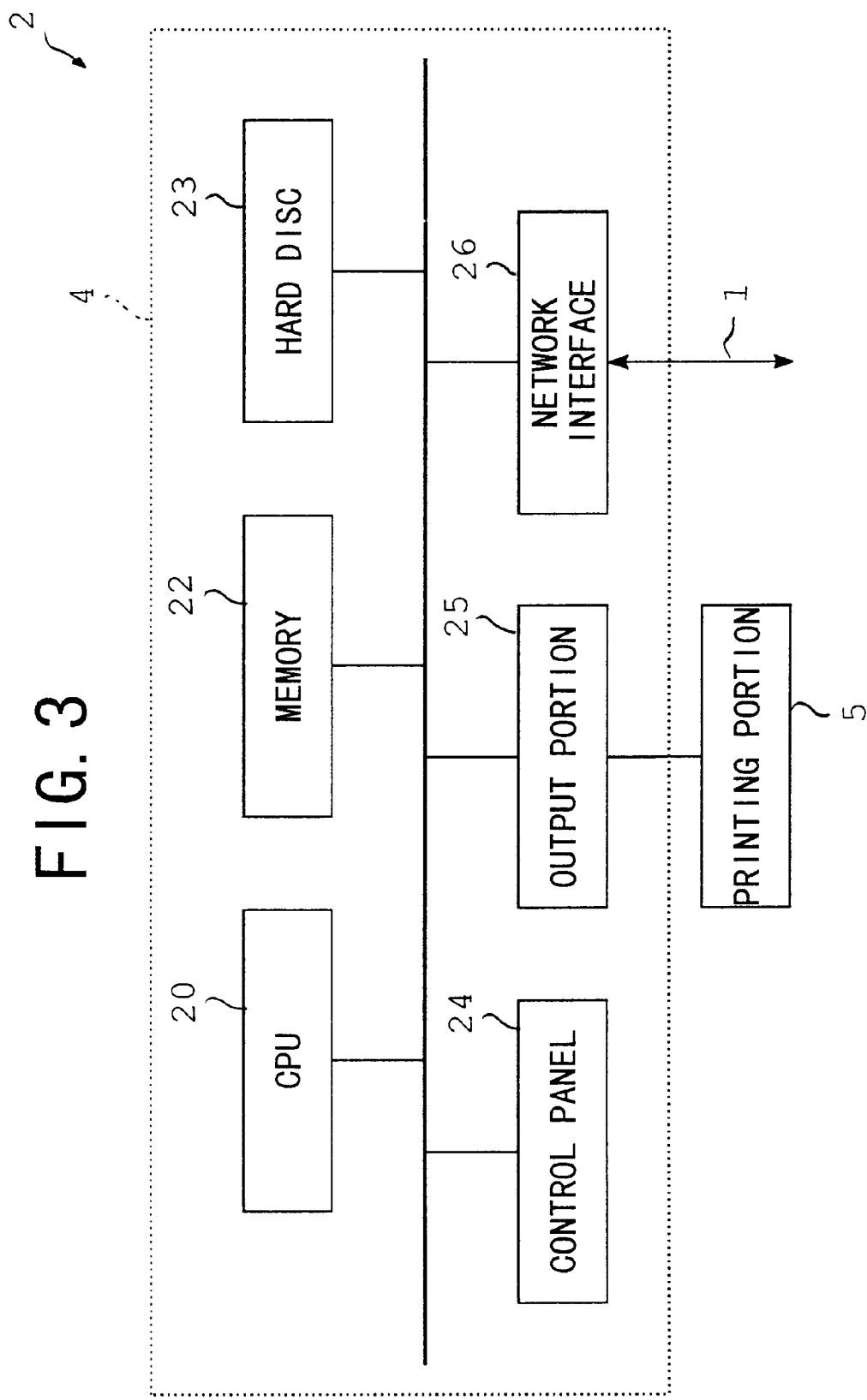
FIG. 3 is a block diagram showing a printer of the printing system according to the first embodiment.

FIG. 3 shows a construction of the printer 2. As shown in FIG. 3, the printing control portion 4 of the printer 2 has a CPU 20, a memory 22, a hard disc 23, a control panel 24, an output portion 25, a network interface 26 and a bus 29.

The network interface 26 serves as an interface to connect the printer 2 with the network 1. The CPU 20 controls the printer 2 and performs a print process and a preview process. The memory 22 is storage for temporarily storing data necessary for operations of the CPU 20. The hard disc 23 stores programs to be executed by the CPU 20. Further, the hard disc 23 is used as temporarily memory spaces for storing various data necessary for the print process or the preview process. The output portion 25 is connected to the printing portion 5. The printing portion 5 has a printing mechanism of, an inkjet type or a laser beam type, and prints images out. The control panel 24 has a number of switches which allow the user to input various instructions such as an instruction to set operation modes of the printer 2. The control panel 24 further has a display device for displaying various messages, such as error messages.

Figure 4:
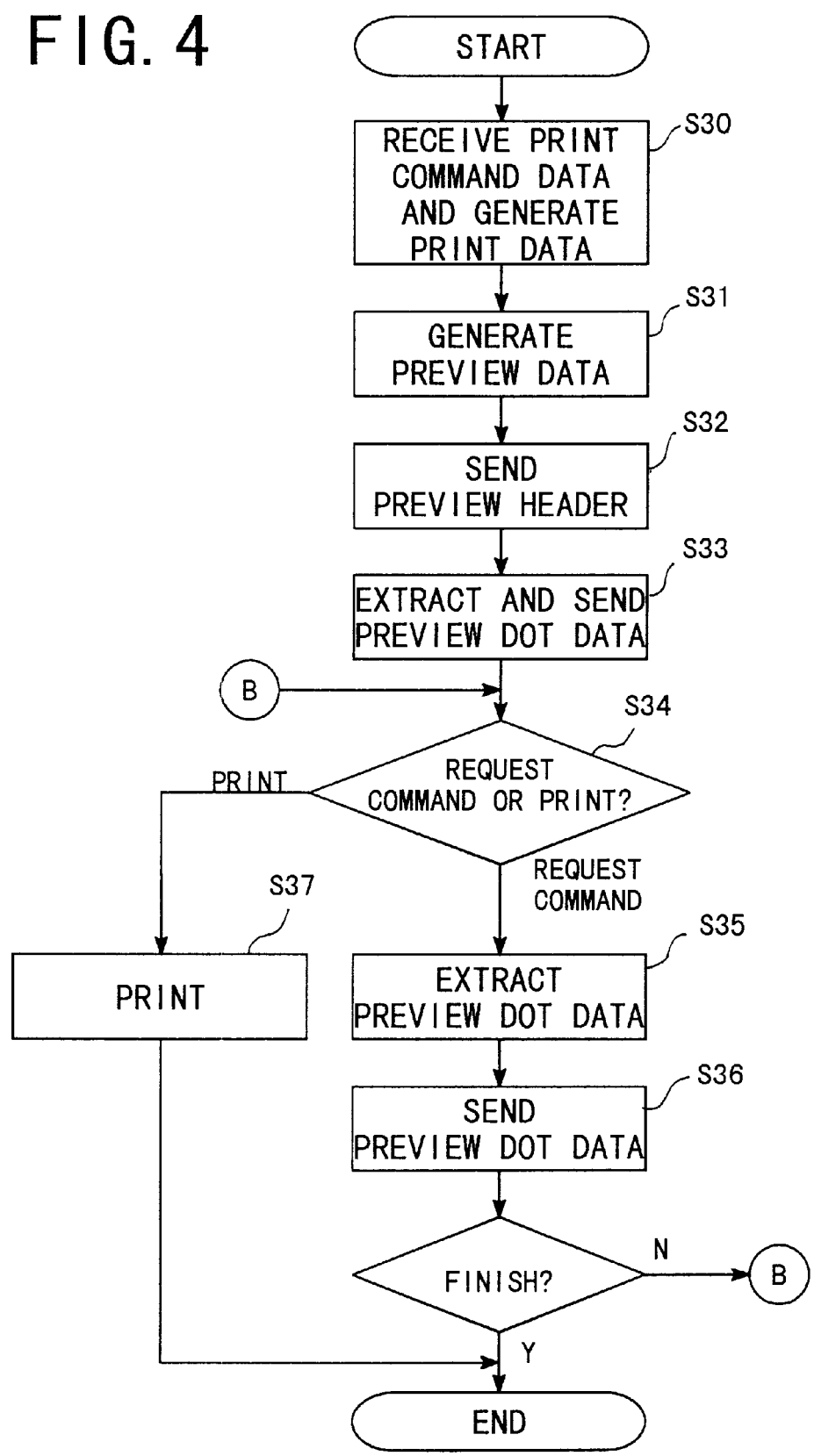
FIG. 4 is a flowchart showing an operation of the printer according to the first embodiment.
Figure 5:
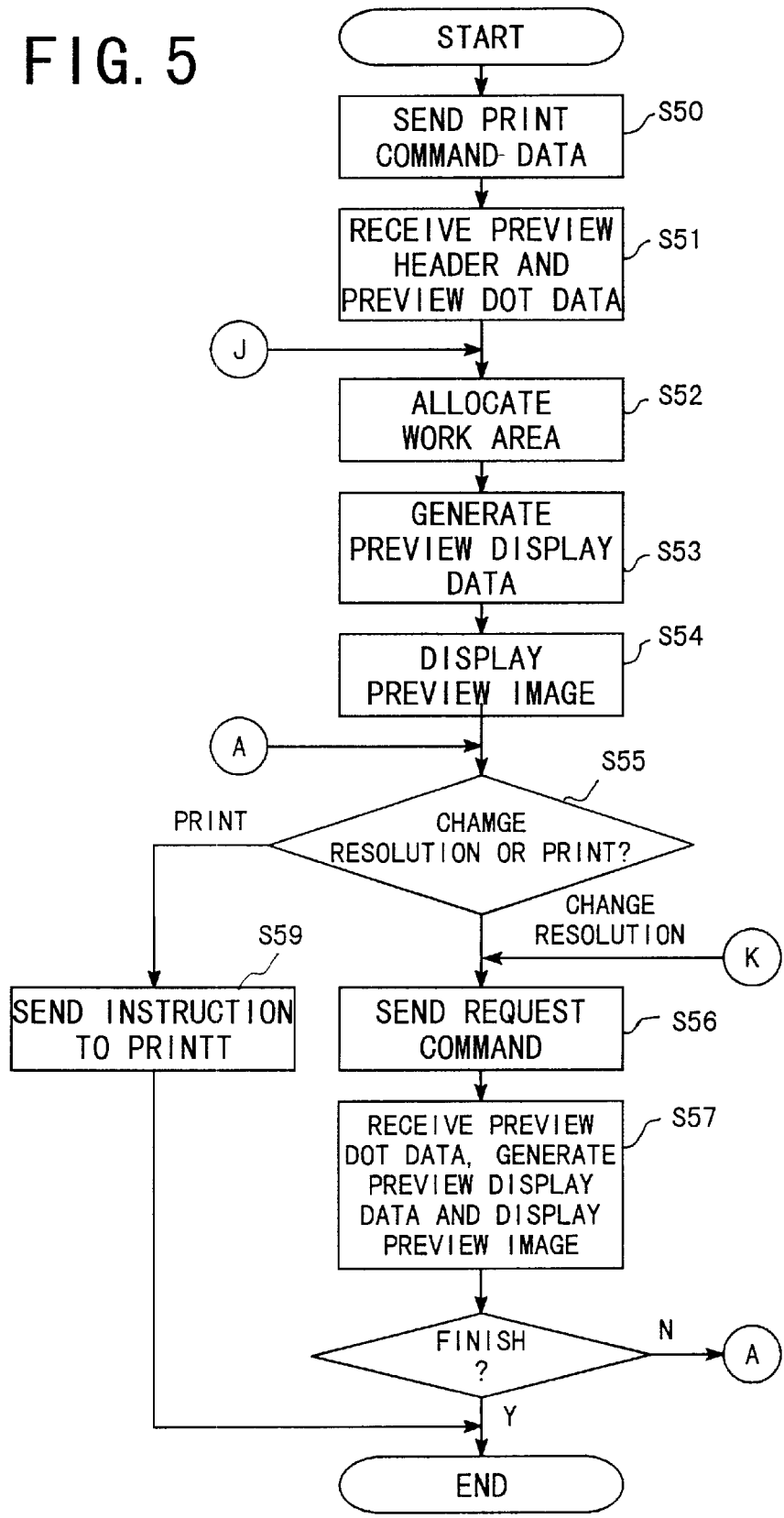
FIG. 5 is a flowchart showing an operation of the computer according to the first embodiment.

Referring to FIGS. 4 through 14, an operation of the printing system 100 will be described. FIG. 4 is a flowchart showing an operation of the printer 2. FIG. 5 is a flowchart showing an operation of the computer 3.

Application software which allows to the computer user to write a document and create an image is installed in each computer 3. The computer user can write a document and draw an image by using the application software on the computer 3. When the computer user writes a document or draws an image on the computer 3, the computer 3 generates document data and image data by using a page description language, such as Post Script, which has been developed by Adobe Systems Incorporated. Next, the computer 3 sends the generated document data and/or image data to the printer 2 via the network 1 (step 50 in FIG. 5). Hereinafter, document data and/or image data generated by using the page description language is referred to as "print command data".

Next, the printer 2 receives the print command data from the computer 3. In the printer 2, the CPU 20 of the printing control portion 4 analyzes command codes of the page description language included in the received print command data, and generates bitmap data to be printed out (step 30 in FIG. 4). Hereinafter, bitmap data to be printed out is referred to as "print data".

Next, the printer 2 generates "preview data". The preview data is used for the preview process. The preview process is a process in which a preview image corresponding to an image to be printed out is displayed on a display device of the computer 3 before printing. The computer user can view the preview image, and confirm the outline of the image to be printed out, for example, font types, font size, layouts, color conditions of the image. In the printing system 100, preview data corresponding to a preview image are generated in the printer 2 by using the print data, so that it is possible to create a preview image more similar to an image to be printed out.

When the printer 2 generates preview data, the printer 2 first allocates a bitmap area to the temporary memory space of the hard disc 23, and next generates preview data on the bitmap area by using print data (step 31). FIG. 6 shows an example of the preview data P1. For clarify, size of the preview data P1 is 16×16 dots. For ease of understanding, each dot of the preview data P1 is numbered (1 through 256).

Next, in FIG. 4, the printer 2 calculates resolution and size of the preview data P1, and writes the resolution and size of the preview data P1 onto a preview header, and then sends the preview header to the computer 3 (step 32). Next, the printer 2 extracts bit data corresponding to specified dots of the preview data P1 stored in the bitmap area. Hereinafter, bit data corresponding to each dot of preview data is referred to as "preview dot data". The printer 2 extracts preview dot data corresponding to specified dots located at a first predetermined positions in the preview data P1. For example, first, the printer 2 divides the preview data P1 into 8×8 areas Pa, Pb, Pc and Pd, each of which has 64 dots and 64 preview dot data, as shown in FIG. 6. Next, the printer 2 extracts one preview dot data from each area Pa, Pb, Pc or Pd. More concretely, the printer 2 extracts preview dot data 1, 9, 129 and 137 corresponding to dots (X1, Y1), (X9, Y1), (X1, Y9) and (X9, Y9). In this example, the first predetermined positions are (X1, Y1), (X9, Y1), (X1, Y9) and (X9, Y9). Next, the printer 2 sends these preview dot data 1, 9, 129 and 137 to the computer 3 (step 33). Thereafter, the printer 2 waits further instructions.

Next, in FIG. 5, the computer 3 receives the preview header and the preview dot data 1, 9, 129 and 137 from the printer 2 and stores them into the hard disc 73 or the memory 72 (step 51).

Next, the computer 3 allocates a work area to the temporary memory space of the hard disc 73 (step 52). Size of the work area is decided by using information included in the preview header. Next, the computer 3 generates "preview display data" on the work area in the following manner (step 53). As shown in FIG. 7, the computer 3 writes the preview dot data 1 on the area (X1, Y1)–(X8, Y8) of the work area, and then writes the preview dot data 9 on the area (X9, Y1)–(X16, Y8), and then writes the preview dot data 129 on the area (X1, Y9)–(X8, Y16), and then writes the preview dot data 137 on the area (X9, Y9)–(X16, Y16). Thus, as shown in FIG. 7, the preview display data P2 is generated on the work area.

Next, the computer 3 displays a preview image corresponding to the preview display data P2 on the CRT 78 (step 54) Thereafter, the computer 3 waits further instructions.

This preview image is only made from the preview dot data 1, 9, 129 and 137. The total amount of these preview dot data is small as compared with the total amount of the whole preview data. For example, the total amount of these preview dot data is 1/64 of the total amount of the whole preview data. Therefore, it is possible to quickly send data to make the preview image from the printer 2 to the computer 3.

In addition, this preview image is rough because it is only made from preview dot data 1, 9, 129 and 137. If the resolution of this preview image is compared with the resolution of an original preview image which is made by using all the preview dot data included in the preview data P1 placed on the bitmap area of the printer 2, the resolution of this preview image is 1/8 of the resolution of the original preview image. However, it is enough for the computer user to confirm the outline of the image to be printed out.

After the preview image is displayed on the CRT 78 at step 54, the printing system 100 of the first embodiment can change the resolution of a part or the whole of the preview image according to an instruction from the computer user. When the computer user wishes to confirm the detail of the image, the computer user inputs an instruction to increase resolution of the preview image, an instruction to designate an increasing amount of resolution and an instruction to designate an area to increase resolution. When the computer 3 receives these instructions from the computer user (step 55), the computer 3 recognizes the increasing amount of the resolution and the area to increase resolution, and sends these information to the printer 2 as a request command (step 56).

For example, after the preview image is displayed on the CRT 78 at step 54, it is assumed that the computer user inputs an instruction to increase resolution of a part of the preview image by two times as high as the resolution of the preview image displayed on the CRT 78 at step 54, and an instruction to designate an area (X1, Y1)–(X8, Y8). The computer 3 receives these instructions, and then recognizes that the magnification of the resolution is two times and the location and size of the area to increase resolution is (X1, Y1)–(X8, Y8), and then sends these information to the printer 2 as a request command.

Next, the printer 2 receives the request command from the computer 3 (step 34), and recognizes that the magnification of the resolution is two times and the location and size of the area to increase resolution is (X1, Y1)–(X8, Y8). Then, the printer 2 extracts preview dot data corresponding to specified dots located at a second predetermined positions in the preview data. For example, as the area to increase resolution corresponds to the area Pa, the printer 2 extracts preview dot data from the area Pa of the preview data P1 placed on the bitmap area (step 35). More concretely, the printer 2 extracts preview dot data 5, 65 and 69 corresponding to dots (X5, Y1), (X1, Y5) and (X5, Y5) from the preview data P1. Namely, the second predetermined positions are (X5, Y1), (X1, Y5) and (X5, Y5). Next, the printer 2 sends these preview dot data 5, 65 and 69 to the computer 3 (step 36).

Next, the computer 3 receives these preview dot data 5, 65 and 69, and generates again the preview display data on the work area with respect to the area (X1, Y1)–(X8, Y8) in the following manner (step 57). As shown in FIG. 8, the computer 3 writes the preview dot data 5 on the area (X5, Y1)–(X8, Y4), and then writes the preview dot data 65 on the area (X1, Y5)–(X4, Y8), and then writes the preview dot data 69 on the area (X5, Y5)–(X8, Y8). In addition, the preview dot data 1 located on the area (X1, Y1)–(X4, Y4) remain. Thus, as shown in FIG. 8, the preview display data P3 is generated. Next, the computer 3 displays a preview image corresponding to the preview display data P3 on the CRT 78. Thus, resolution of the preview image is partially increased by two times as high as the resolution of the preview image displayed on the CRT 78 at step 54.

On the other hand, after the preview image is displayed on the CRT 78 at step 54, it is assumed that the computer user inputs an instruction to increase resolution of a part of the preview image by four times as high as the resolution of the preview image displayed on the CRT 78 at step 54, and an instruction to designate an area (X1, Y1)–(X8, Y8). The computer 3 receives these instructions, and then recognizes that the magnification of the resolution is four times and the location and size of the area to increase resolution is (X1, Y1)–(X8, Y8), and then sends these information to the printer 2 as a request command.

Next, the printer 2 receives the request command from the computer 3 (step 34), and recognizes that the magnification of the resolution is four times and the location and size of the area to increase resolution is (X1, Y1)–(X8, Y8). Then, the printer 2 extracts preview dot data corresponding to specified dots located at a third predetermined positions in the preview data P1. For example, as the area to increase resolution corresponds to the area Pa, the printer 2 extracts 16 print bit data from the area Pa of the preview data P1 placed on the bitmap area (step 35). More concretely, the printer 2 extracts preview dot data 3, 5, 7, 33, 35, 37, 39, 65, 67, 69, 71, 97, 99, 101 and 103 corresponding to dots (X3, Y1), (X5, Y1), (X7, Y1), (X1, Y3), (X3, Y3), (X5, Y3), (X7, Y3), (X1, Y5), (X3, Y5), (X5, Y5), (X7, Y5), (X1, Y7), (X3, Y7), (X5, Y7) and (X7, Y7) from the preview data P1. Namely, the third predetermined positions are (X3, Y1), (X5, Y1), (X7, Y1), (X1, Y3), (X3, Y3), (X5, Y3), (X7, Y3), (X1, Y5), (X3, Y5), (X5, Y5), (X7, Y5), (X1, Y7), (X3, Y7), (X5, Y7) and (X7, Y7). Next, the printer 2 sends these preview dot data to the computer 3 (step 36).

Next, the computer 3 receives these preview dot data, and generates again the preview display data on the work area P4, as shown in FIG. 9. Next, the computer 3 displays a preview image corresponding to the preview display data P4 on the CRT 78. Thus, resolution of the preview image is partially increased by four times as high as the resolution of the preview image displayed on the CRT 78 at step 54.

On the other hand, after the preview image is displayed on the CRT 78 at step 54, it is assumed that the computer user inputs an instruction to increase resolution of a part of the preview image by eight times as high as the resolution of the preview image displayed on the CRT 78 at step 54, and an instruction to designate an area (X1, Y1)–(X8, Y8). The computer 3 receives these instructions, and then recognizes that the magnification of the resolution is eight times and the location and size of the area to increase resolution is (X1, Y1)–(X8, Y8), and then sends these information to the printer 2 as a request command.

Next, the printer 2 receives the request command from the computer 3 (step 34), and recognizes that the magnification of the resolution is eight times and the location and size of the area to increase resolution is (X1, Y1)–(X8, Y8). Then, the printer 2 extracts preview dot data corresponding to specified dots located at a fourth predetermined positions in the preview data P1. For example, as the area to increase resolution corresponds to the area Pa, the printer 2 extracts 64 preview dot data from the preview data P1 placed on the bitmap area (step 35). More concretely, the printer 2 extracts preview dot data 2 through 8, 17 through 24, 33 through 40, 49 through 56, 65 through 72, 81 through 88, 97 through 104, 113 through 120 corresponding to all dots included in the area Pa from the preview data P1 except for preview dot data 1. Namely, the fourth predetermined positions are all of the dots included in the area Pa except for a dot (X1, Y1). Next, the printer 2 sends these preview dot data to the computer 3 (step 36).

Next, the computer 3 receives these preview dot data, and generates again the preview display data P5 on the work area, as shown in FIG. 10. Next, the computer 3 displays a preview image corresponding to the preview display data P5 on the CRT 78. Thus, resolution of the preview image is partially increased by eight times as high as the resolution of the preview image displayed on the CRT 78 at step 54.

Thus, the computer user can confirm not only the outline of the image but also the detail of the image on the basis of the preview image by changing resolution of the preview image. Then, the computer user inputs an instruction to print the image out. In response to this instruction, the computer 3 sends this instruction to the printer 2 (step 59). When the printer 2 receives this instruction, the printing control portion 4 sends the print data to the printing portion 5 (step 37). Thus, the image corresponding to the print data is printed out by the printing portion 5.

As described above, to display the preview image on the CRT 78 of the computer 3, the printer 2 extracts preview dot data from the preview data, and sends it to the computer 3. As the amount of the preview dot data is small as compared with the total amount of the preview data, it is possible to send the preview dot data in a short time. The computer 3 generates preview display data by using the received preview dot data and displays a preview image corresponding to the preview display data on the CRT 78. Therefore, the preview image is rough. However, it is enough for the computer user to confirm the outline of the image to be printed out.

If the computer user wishes to the detail of the image, the computer user can instruct the computer 3 to increase resolution of the preview image. In response to this instruction, the computer 3 further obtains the preview dot data from the printer 2, and increases resolution of the preview image by using the obtained preview dot data, as described above. Thus, the computer user can confirm the detail of the image to be printed out.

Further, the printing system 100 can change not only resolution of the preview image but also size of the preview image in the following manner.

First, the printer 2 receives print command data from the computer 3, and then converts it into print data, and then generates preview data P1 on the bitmap area by using the print data, as shown in FIG. 6. Next, the printer 2 extracts, for example, preview dot data 1, 9, 129 and 137 from the preview data P1, and sends them to the computer 3.

Figure 11:
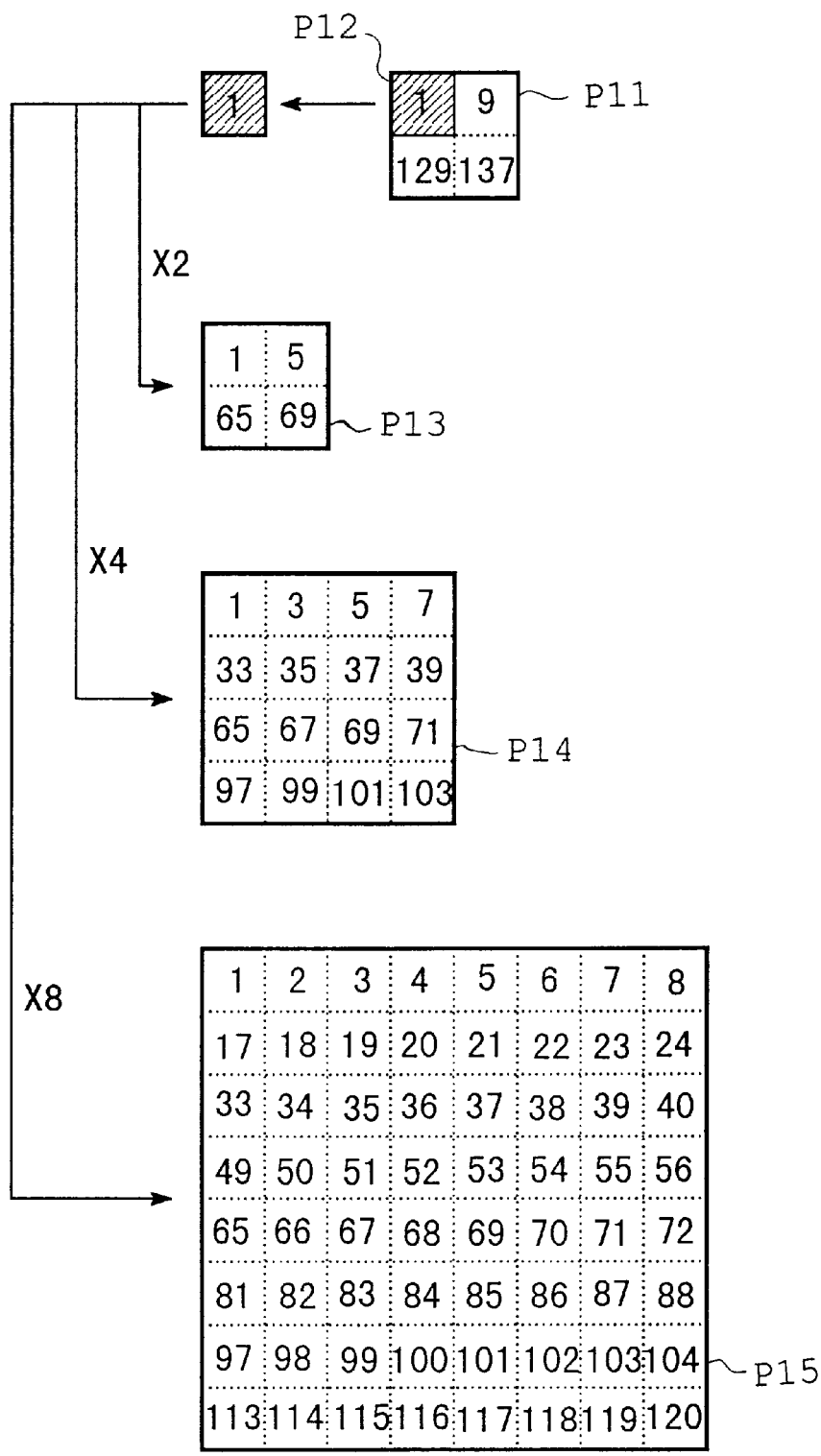
FIG. 11 is a diagram showing a preview image and magnified preview images according to the first embodiment.
Figure 12:
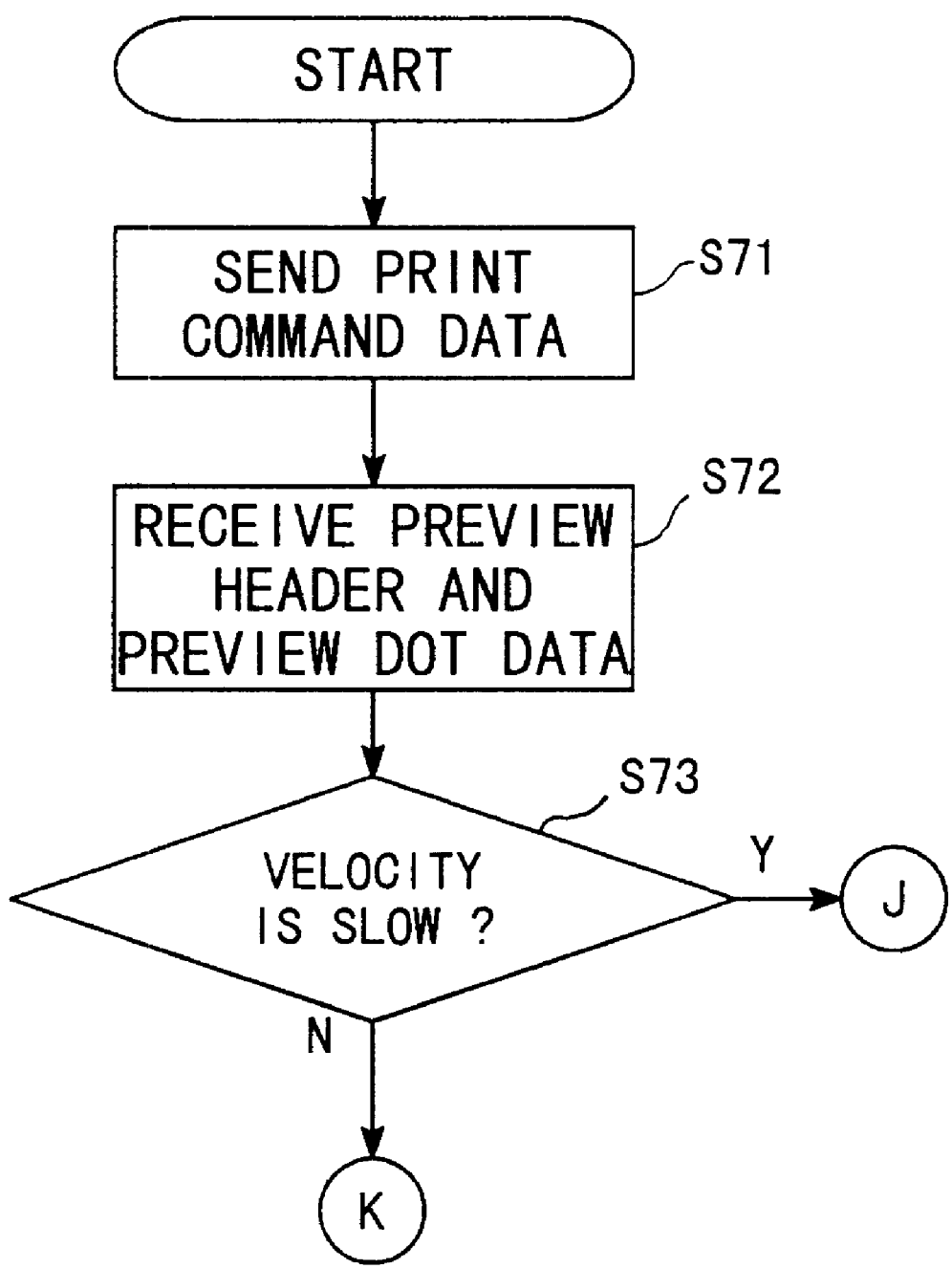
FIG. 12 is a flowchart showing an operation of the computer according to the first embodiment.

Next, the computer 3 receives the preview dot data 1, 9, 129 and 137 and placed them onto a video memory for the CRT 78. Therefore, a preview image P11 is displayed on the CRT 78, as shown in FIG. 11. If the size of the preview image P11 is compared with the size of an original preview image which is made by using all the preview dot data included in the preview data P1 placed on the bitmap area of the printer 2, the size of the preview image P11 is ⅛ of the size of the original preview image.

Next, it is assumed that the computer user inputs an instruction to magnify an area P12 of the preview image P11 by two times, into the computer 3. The computer 3 receives this instruction from the computer user, and sends this instruction to the printer 2 as a request command.

Next, the printer 2 receives the request command from the computer 3. In response to this request command, the printer 2 extracts preview dot data 5, 65 and 69 from the preview data P1 placed on the bitmap area, and sends these preview dot data to the computer 3.

Next, the computer 3 receives these preview dot data, and places them onto the video memory for the CRT 78. Therefore, a magnified preview image P13 is displayed on the CRT 78, as shown in FIG. 11. The size of the magnified preview image P13 is two times as large as the size of the area P12 of the preview image P11, and the resolution of the magnified preview image P13 is two times as high as the resolution of the area P12.

On the other hand, it is assumed that the computer user inputs an instruction to magnify an area P12 of the preview image P11 by four times, into the computer 3. The computer 3 receives this instruction from the computer user, and sends this instruction to the printer 2 as a request command.

Next, the printer 2 receives this request command from the computer 3. In response to this request command, the printer 2 extracts preview dot data 3, 5, 7, 33, 35, 37, 39, 65, 67, 69, 71, 97, 99, 101 and 103 from the preview data P1 placed on the bitmap area, and sends these preview dot data to the computer 3.

Next, the computer 3 receives these preview dot data, and places them onto the video memory for the CRT 78. Therefore, a magnified preview image P14 is displayed on the CRT 78, as shown in FIG. 11. The size of the magnified preview image P14 is four times as large as the size of the area P12 of the preview image P11, and the resolution of the magnified preview image P14 is four times as high as the resolution of the area P12.

On the other hand, it is assumed that the computer user inputs an instruction to magnify an area P12 of the preview image P11 by eight times, into the computer 3. The computer 3 receives this instruction from the computer user, and sends this instruction to the printer 2 as a request command.

Next, the printer 2 receives this request command from the computer 3. In response to this request command, the printer 2 extracts all of the preview dot data included in the area (X1, Y1)–(X8, Y8) of the preview data P1 except for preview dot data 1, and sends these preview dot data to the computer 3.

Next, the computer 3 receives these preview dot data, and places them onto the video memory for the CRT 78. Therefore, a magnified preview image P15 is displayed on the CRT 78, as shown in FIG. 11. The size of the magnified preview image P15 is eight times as large as the size of the area P12 of the preview image P11, and the resolution of the magnified preview image P15 is eight times as high as the resolution of the area P12.

Thus, the printing system 100 can change resolution and size of the preview image. The computer user can confirm the detail of the image on the basis of the magnified preview image.

Furthermore, the printing system 100 can change resolution of the preview image, depending on congestion of the network 1.

First, the computer 3 sends print command data to the printer 2 (step 71). Next, the printer 2 receives the print command data from the computer 3, and then converts it into print data, and then generates preview data P1 on the bitmap area by using the print data, as shown in FIG. 6. Next, the printer 2 extracts, for example, all of the preview dot data 1 through 256 from the preview data P1, and sends them to the computer 3 together with the preview header including information with respect to the resolution and size of the preview data P1.

Next, the computer 3 receives the preview header and begins to receive the preview dot data (step 72).

During the reception of the preview dot data, the computer 3 measures velocity of the reception of the preview dot data. For example, the computer 3 measures the amount of the received preview dot data within a predetermined length of time, and then divides the measured amount by the predetermined length of time. Thus, the computer 3 obtains the velocity of the reception of the preview dot data.

Next, the computer 3 determines whether or not the velocity of the reception of the preview dot data is slower than a reference velocity (step 73). The reference velocity has been set at a suitable value by the computer user. If the velocity is not slower than the reference velocity, the computer 3 continues to receive the preview dot data. This means that the network 1 is not crowded. Then, if the reception of the preview dot data has been completed, the process proceeds to step 52 in FIG. 5. Then, the computer 3 allocates a work area (step 52), generates preview display data by using the received preview dot data (step 53), and displays a preview image corresponding to the preview display data on the CRT 78 (step 54). Therefore, the high resolution preview image is displayed. Thus, when the network 1 is not crowded, the high resolution preview image is displayed.

On the other hand, if the velocity is slower than the reference velocity, the process proceeds to step 56 in FIG. 5. This means that the network 1 is crowded. Then, the computer 3 stops the reception of the preview dot data, and issues an instruction to decrease resolution of the preview image, and sends the instruction to the printer 2 as a request command (step 56). Next, the printer 2 receives the request command from the computer 3 (step 34), and extracts, for example, preview dot data 1, 9, 129 and 137 from the preview data P1 in FIG. 6 (step 35), and then sends the extracted preview dot data to the computer 3. Next, the computer 3 receives the preview dot data 1, 9, 129 and 137, and generates the preview display data P2, as shown in FIG. 7. Therefore, the low resolution preview image is displayed on the CRT 78.

Thus, when the network 1 is crowded, resolution of the preview image decreases. Therefore, the amount of the preview dot data to be sent from the printer 2 to the computer 3 becomes small, so that it is possible to send the preview dot data in a short time from the printer 2 to the computer 3.

In addition, although the CPU 70 of the computer 3 performs the process shown in FIG. 5 by executing the program stored in the hard disc 73, the CPU 70 may perform the process shown in FIG. 5 by reading a program recorded on the program storage device, such as a CD-ROM, a floppy disc, and a flexible disc, with a program storage device reproduction apparatus, such as a CD-ROM disc driver, a floppy disc driver and a flexible disc driver. Furthermore, although the CPU 20 of the printer 2 performs the process shown in FIG. 4 by executing the program stored in the hard disc 23, the CPU 20 may perform the process shown in FIG. 4 by reading the program recorded on a program storage device with a program storage device reproduction apparatus.

Second Embodiment

Next, a second embodiment of the present invention will be described with reference to FIGS.13 through 17.

Figure 13:
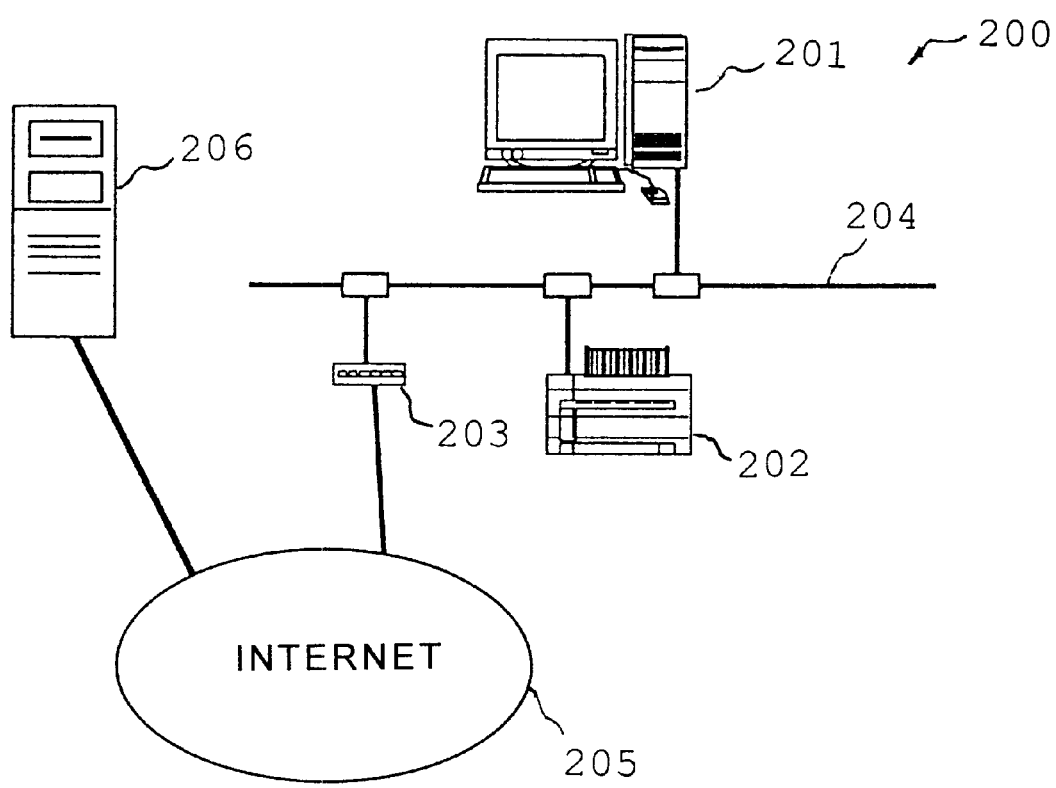
FIG. 13 is a diagram showing a printing system of a second embodiment of the present invention.

FIG. 13 shows a print system 200 of the second embodiment of the present invention. As shown in FIG. 13, the print system 200 has a client computer 201 and a printer 202. The client computer 201 and the printer 202 are connected with each other via a local network 204. The local network 204 is connected to an internet 205. A router 203 serves as an interface to connect the local network 204 to the internet 205. A variety of computers including a server computer 206 are connected to the internet 205.

The client computer 201 is, for example, a personal computer. A browser software is installed in the client computer 201. The browser software allows the client computer 201 to access the server computer 206 via the internet 205. Further, the browser software can display HTML data and image data on the display device of the client computer 201. The HTML data is data written in HTML (Hyper Text Markup Language).

The server computer 206 stores various information including HTML data and image data. When the client computer 201 accesses the server computer 206, the server computer 206 provides the HTML data and the image data for the client computer 201.

An HTTP (Hyper Text Transfer Protocol) protocol is used for the communication between the client computer 201 and the server computer 206.

When the client computer 201 accesses the server computer 206 via the internet 205 and fetches specified HTML data and/or image data from the server computer 206, the client computer 201 designates the specified HTML data and/or image data by using a URL (Uniform Resource Locator). The URL has a fixed format as follows:

"Protocol Name://Server Name/Path Name/data Name (File Name)". For example, when the user of the client computer 201 wish to obtain a specified HTML data, the user inputs a name of a specified server computer, a name of the specified HTML data and other necessary data into the client computer 201 in accordance with the aforementioned URL format. Then, the client computer 201 accesses the specified server computer via the internet 205, and fetches the specified HTML data. The fetched HTML data is displayed on the display device of the client computer 201. The user can view the displayed HTML data.

Furthermore, a description of the URL may be contained in HTML data. When the client computer 201 fetches HTML data containing a description of the URL and recognizes the description of the URL, the client computer 201 can further access another server computer according to the description of the URL and fetch another HTML data or image data.

The printer 202 has two functions. When the printer 202 receives HTML data and/or image data from the client computer 201 via the local network 204, the printer 202 prints the received HTML data and/or image data onto a printing medium, such as printing paper. On the other hand, when the printer 202 receives a description of the URL from the client computer 201 via the local network 204, the printer 202 accesses a specified server computer via the internet 205 according to the received description of the URL and fetches a specified HTML data and/or image data from the specified server computer, and prints the fetched HTML data and/or image data onto a printing medium.

Figure 14:
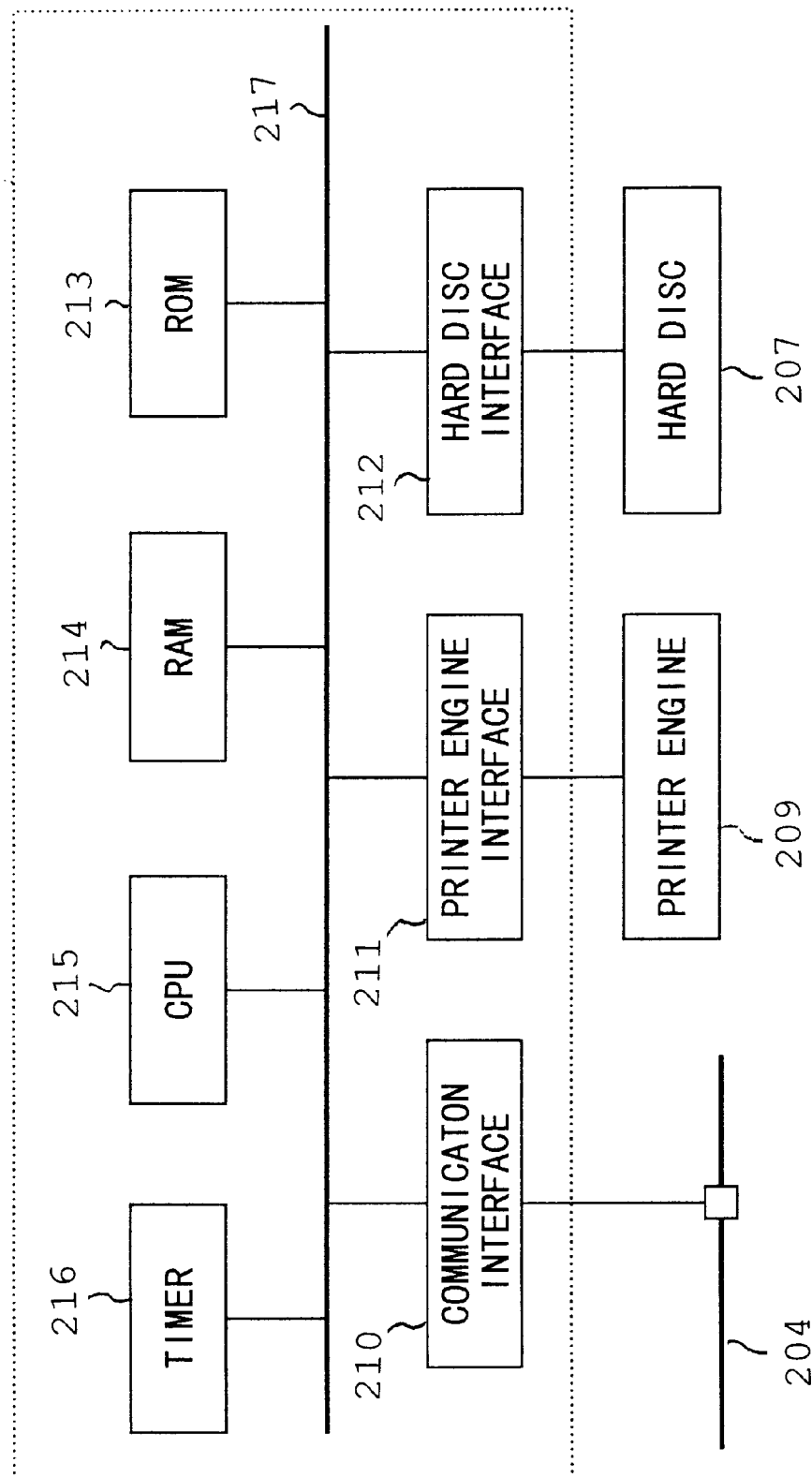
FIG. 14 is a block diagram showing a printer of the printing system according to the second embodiment.

FIG. 14 shows a construction of the printer 202. As shown in FIG. 14, the printer 202 has a printer controller 208, a printer engine 209 and a hard disc 207. The printer controller 208 has a communication interface 210, a printer engine interface 211, a hard disc interface 212, a ROM 213, a RAM 214, a CPU 215, a timer 216 and a bus 217.

The communication interface 210 serves as an interface to connect the printer controller 208 with the local network 204. Therefore, the printer 202 is connected to the internet 205 via the communication interface 210, the local network 204 and the router 203. The printer engine interface 211 serves as an interface to connect the printer engine 209 with the printer controller 208. The hard disc interface 212 serves as an interface to connect the hard disc 207 with the printer controller 208. The ROM 213 is storage for storing control programs to control operations of the printer 202 and character font data and other necessary data. The RAM 214 is storage for temporarily storing HTML data and/or image data received from the server computer 206 via the internet 205 and other data necessary for operations of the printer 202. The CPU 215 executes the control programs stored in the ROM 13, and controls operations of the printer 202. In the printer controller 208, these devices are interconnected by the bus 217.

The printer engine 209 has a printing mechanism of an inkjet type, a laser type or the like. The printer engine 209 receives print data from the printer controller 208, and prints images corresponding to the print data onto a printing medium. The hard disc 207 serves as a spooler for storing print jobs.

Figure 15:
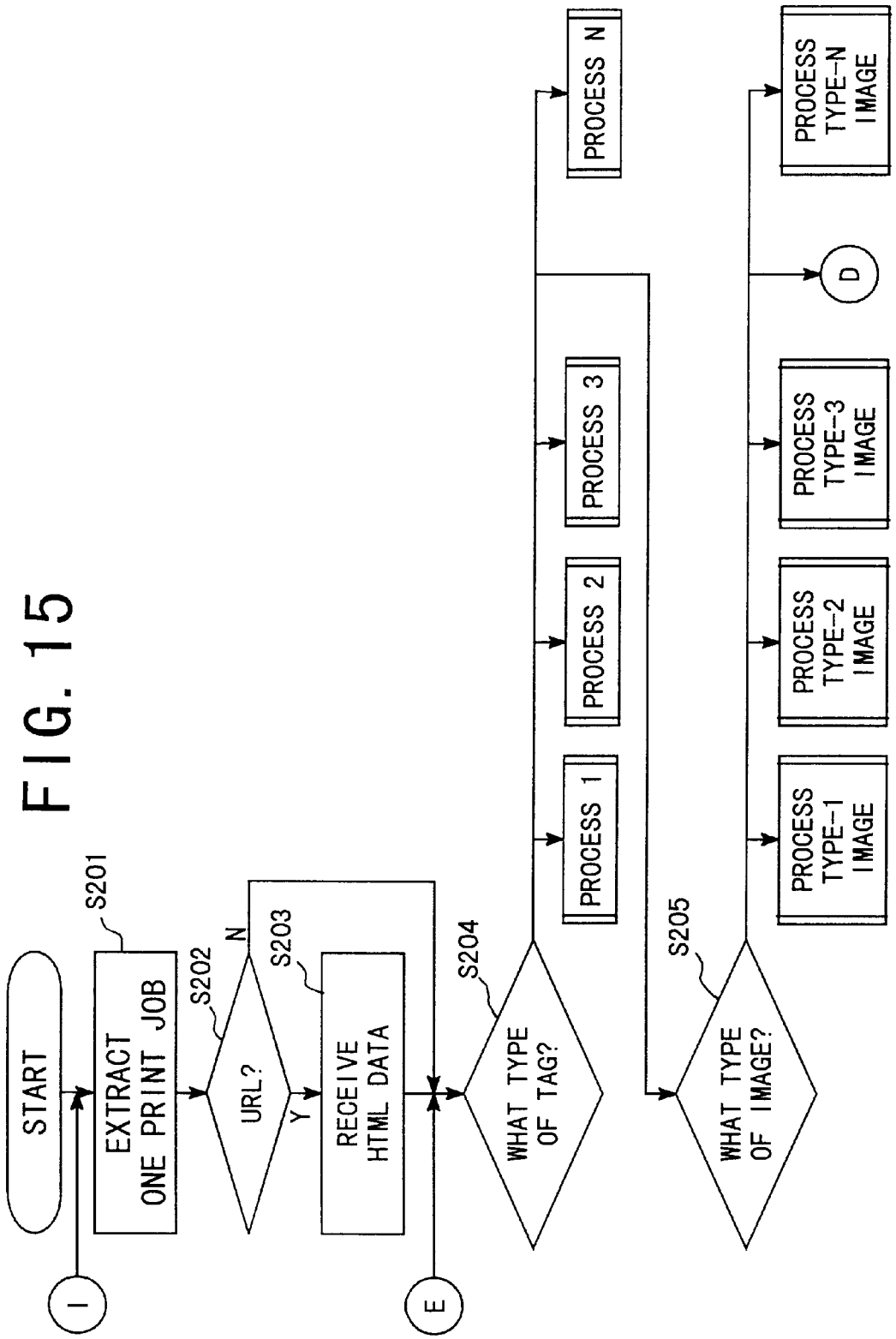
FIGS. 15 through 17 are flowcharts showing an operation of the printer according to the second embodiment.
Figure 16:
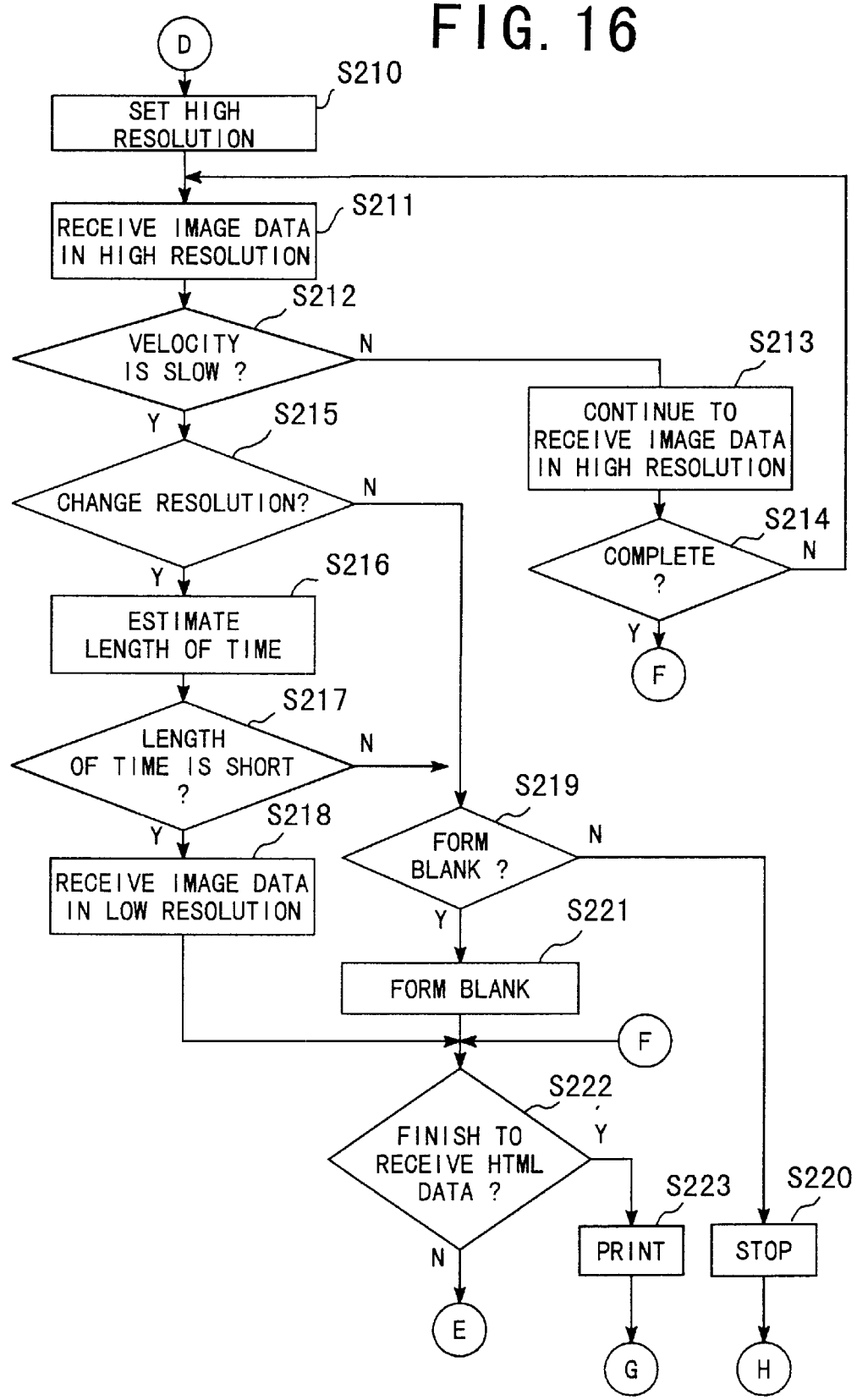
Figure 17:
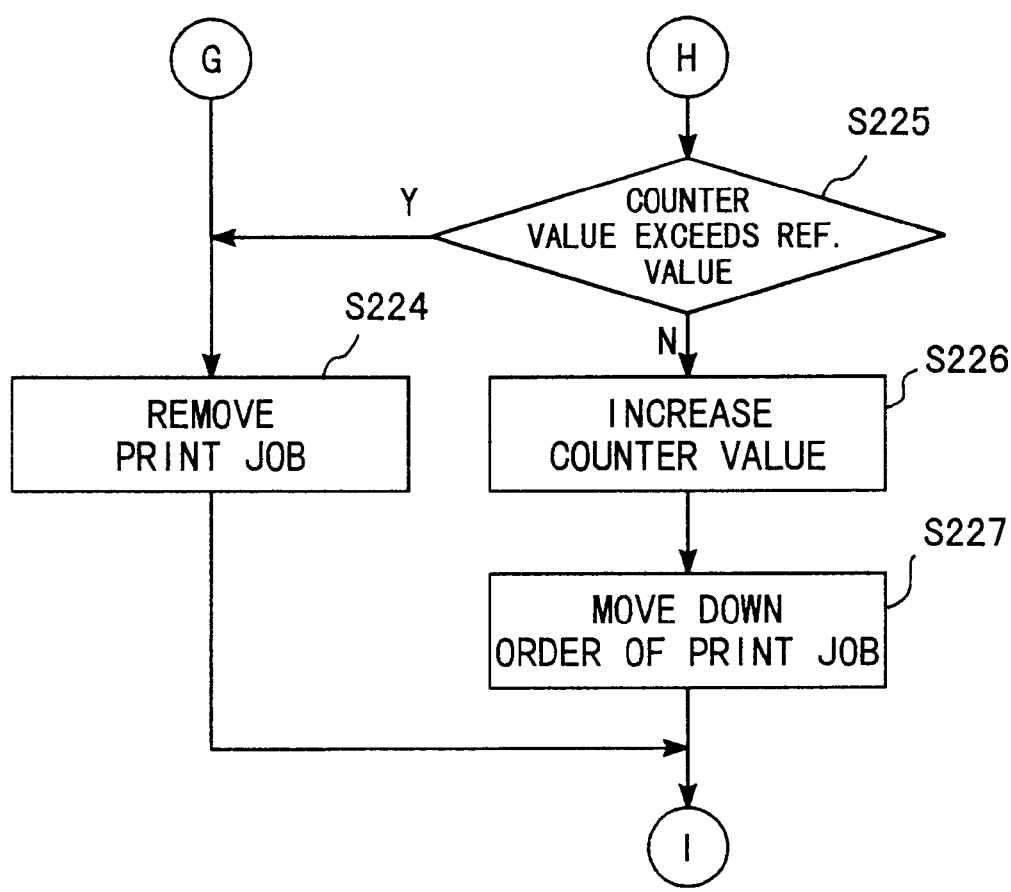

FIGS. 15 through 17 show an operation of the printer 202. Referring to FIGS. 15 through 17, the operation of the printer 202 will be described.

HTML data or a description of the URL sent from the client computer 201 to the printer 202 is spooled in the hard disc 207 of the printer 202. The print controller 208 manages the spooled HTML data and descriptions of the URL as print jobs.

The printer controller 208 extracts one of the print jobs spooled in the hard disc 207 (step 201), and determines whether the extracted print job is HTML data or a description of the URL (step 202). If the extracted print job is a description of the URL, the printer controller 208 accesses a specified server computer, for example, the server computer 206 via the internet 205 according to the description of the URL, and fetches a specified HTML data from the sever computer 206 (step 203). Then, the specified HTML data is sent from the server computer 206 to the printer 202 via the internet 205, the router 203 and the local network 204, and it is stored into the RAM 214. On the other hand, if the extracted print job is HTML data, the printer controller 202 sends the HTML data from the hard disc 207 to the RAM 204.

Next, the printer controller 208 identifies a "tag" included in the HTML data stored in the RAM 204 (step 204). A "tag" is a kind of command to display HTML data on the display device or to print HTML data onto a printing medium. A plurality of types of tags are included in HTML data. For example, "<HTML>" is a tag indicating that the next data is HTML data. "<HEAD>" is a tag indicating that the next data is header information. "<BODY>" is a tag indicating that the next data is document data. "<IMG SRC="Path Name/File Name" width=xx height=xx . . . >" is a tag indicating the image data. The tag indicating the image data includes information of the address of the image data, the size of the image data and so on. In addition to these tags, there are various kinds of tags, such as a tag indicating a title of HTML data, a tag indicating a font, a tag indicating a hyper text link and so on.

At step 204, the printer controller 208 identifies a tag, and selects a specified process to display or print data indicated by this tag. If the printer controller 208 identifies a tag indicating image data, the printer controller 208 next identifies the type of image data (step 205). There are a plurality of types of image data, such as a GIF (Graphics Interohange Format), a JPEG (Joint Photographic Experts Group), an XBM (X11 Bit Map Format), a DIB (Device independent Bitmap), a TIFF (Tagged Image File Format) and so on. These image data are different from each other in the number of color, algorithm of compression and other properties. Further, among these image data, there are the type of image data which can be displayed in more than one resolution (i.e., the resolution of the image data can be changed).

At step 205, the printer controller 208 identifies the type of image data, and selects a specified process to display or print the identified type of image data. If the printer controller 208 identifies the type of image data which can be displayed in more than one resolution, the printer controller 208 carries out the process shown in FIG. 16. In addition, information identifying the type of image data is included in the tag indicating image data.

In FIG. 16, first, the printer controller 208 sets resolution of the image data to be received at a high resolution (step 210). Next, the printer controller 208 requests the server computer 206 to send the image data indicated by the tag in the high resolution, and then, the printer controller 208 begins to receive the image data from the sever computer 206 via the internet 205 and the local network 204 (step 211).

Next, the printer controller 208 measures velocity of the reception of the image data. For example, the printer controller 208 measures the amount of the received data within a predetermined length of time, and then divides the measured amount by the predetermined length of time. Thus, the printer controller 208 obtains the velocity of the reception of the image data. The timer 216 is used for measuring the predetermined length of time. In addition, if the predetermined length of time is short, a momentary velocity can be obtained. If the predetermined length of time is long, an average of velocity can be obtained. Therefore, this length of time is set at suitable length for the measurement of velocity of the reception of the image data.

Next, the printer controller 208 determines whether or not the velocity of the reception of the image data is slower than a reference velocity (step 212). The reference velocity has been set at a suitable value by the user of the printer 202.

If the velocity of the reception of the image data is not slower than a reference velocity, the printer controller 208 continues to receive the image data in the high resolution (step 213). Next, the printer controller 208 determines whether or not the reception of the image data has been completed (step 214). If so, the process proceeds to step 222. If not, the process returns to step 211, and the reception of the image data is continued until the reception of the image data is completed, unless the velocity of the reception of the image data becomes slower than the reference velocity.

If the velocity of the reception of the image data is slower than the reference velocity, the printer controller 208 further determines whether or not the resolution of the image data that is now receiving from the server computer 206 is changed from the high resolution to a low resolution (step 215). By the user, it has been decided, in advance, whether or not the resolution of the image data is changed from the high resolution to the low resolution. If it has been decided, by the user, that the resolution of the image data is changed from the high resolution to the low resolution, the printer controller 208 estimates the length of time necessary for receiving the whole image data in the low resolution on the basis of the size of the image data and the velocity of the reception of the image data at this time (step 216).

Next, the printer controller 208 determines whether or not the estimated length of time is shorter than the reference length of time (step 217). In addition, the reference length of time is set in advance by the user. If the estimated length of time is shorter than the reference length of time, the printer controller 208 stops the reception of the image data in the high resolution, and then changes the resolution of the image data from the high resolution to the low resolution, and then receives the image data in low resolution (step 218). When the reception of the image data is completed, the process proceeds to step 222.

On the other hand, if, at step 215, it has not been decided, by the user, that the resolution of the image data is changed from the high resolution to the low resolution (step 215: NO), or if, at step 217, the estimated length of time is not shorter than the reference length of time (step 217: NO), the printer controller 208 determines whether or not a blank space forming process is performed (step 219). The blank space forming process is a process of forming a blank space whose size is the same as the size of the image data to be received, and replacing the image data by this blank space. By the user, It has been decided, in advance, whether or not the blank space forming process is performed. If it has been decided, by the user, that the blank space forming process is performed, the printer controller 208 stops the reception of the image data, and performs the blank space forming process (step 212).

Next, the printer controller 208 determines whether or not the reception of the HTML data has been completed (step 222). If the reception of the HTML data has been completed, the printer controller 208 converts the HTML data and image data into print data, and sends it to the printer engine 209 (step 223). Therefore, the document and images corresponding to the HTML data and image data are printed onto a printing medium, and the process of receiving and printing the HTML data and image data ends. In addition, if the blank space forming process was performed, the images corresponding to image data is not printed.

Next, the printer controller 208 removes the extracted print job (the print job that has been extracted at step 201) from the hard disc 207 (step 234).

On the other hand, if, at step 219, it has not been decided, by the user, that the blank space forming process is performed (step 219: NO), the printer controller 208 stops the reception of the image data, and stops the process of receiving and printing the HTML data and image data (step 220).

Next, the printer controller 208 determines how many times the aforementioned process (steps 201 through 204 and 210 through 220) has been performed on the extracted print job. Actually, the counter installed in the printer controller 208 counts how many times the aforementioned process has been performed on the extracted print job. If a value of the counter is not more the predetermined value (step 225: NO), a value of the counter is increased by one (step 226).

Next, the printer controller 208 moves down the order of the extracted print job (step 227). A plurality of print jobs are arranged in the hard disc 207. The print jobs are usually arranged in order of the time when each print job is stored in the hard disc 207. At step 227, the printer controller 208 changes the order of the print jobs, and moves the extracted print job behind the other print job. Then, the process returns to step 201, and the next print job is extracted from the hard disc 207.

If, at step 225, a value of the counter is more the predetermined value, the printer controller 208 removes the extracted print job from the hard disc 207 (step 224). Then, the process returns to step 201, and the next print job is extracted from the hard disc 207.

According to the print system 200 of the second embodiment of the present invention, the following advantageous effects can be obtained.

(1) When a large number of client computers access the same server computer at the same time, or when one communication line included in the internet 205 is used by a, large number of communications, the velocity of the communication between the client computer and the server computer becomes slow, while size of image data is relatively large. Therefore, if the communication lines are crowded, it takes a long time for sending image data from the server computer 206 to the client computer 201. In this case, the print controller 208 reduces the resolution of image data. Therefore, size of the image data is also reduced. As a result, it is possible to send the image data from the server computer 206 to the client computer 201 in short time, if the communication lines are crowded.

(2) If the velocity of the communication between the client computer and the server computer is very slow, the print controller 208 replaces image data by the blank space. Although the image data cannot be obtained, other parts of the HTML data, such as document data, can be obtained quickly.

(3) If the velocity of the communication between the client computer and the server computer is very slow, the print controller 208 stops the process of receiving and printing the HTML data and image data, and moves the print job behind another print job. Accordingly, another print job can be executed without long delay.

In addition, although the CPU 215 of the printer 202 performs the process shown in FIGS. 15 through 17 by executing the program stored in the ROM 213, the CPU 215 may perform the process shown in FIGS. 15 through 17 by reading the program stored in a program storage device, such as a CD-ROM, a floppy disc and a flexible disc with a program storage device reproduction apparatus, such as a CD-ROM disc driver, a floppy disc driver and a flexible disc driver.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 09-284706 and NO. 09-284709 both filed on Sep. 30, 1997 including the specification, claims, drawings and summary are incorporated herein by reference in their entirety.

What is claimed is:

1. A printing system comprising at least one data processing apparatus for generating data to form an image and a printing apparatus for printing the image, the data processing apparatus and the printing apparatus being connected with each other via a network, (a) the data processing apparatus comprising:
  a generating device for generating print command data, the print command data including a plurality of commands to form the image to be printed;
  a print command data sending device for sending the generated print command data to the printing apparatus;
  a dot data receiving device for receiving dot data from the printing apparatus;
  a preview image forming device for forming a preview image by using the received dot data;
  a displaying device for displaying the preview image; and
  a request command sending device for sending a request command to the printing apparatus;
(b) the printing apparatus comprising:
  a print command data receiving device for receiving the print command data from the data processing apparatus;
  a converting device for converting the received print command data into print data, the print data including a plurality of the dot data each of which corresponds to a different dot of the image to be printed;
  a first extracting device for extracting a first part of the dot data included in the print data;

a dot data sending device for sending the extracted dot data to the data processing apparatus via the network;

a request command receiving device for receiving the request command from the data processing apparatus; and a second extracting device for extracting a second part of the dot data included in the print data in response to the received request command, wherein the data processing apparatus reforms the preview image by using the first part of the dot data and the second part of the dot data.

2. A printing system according to claim 1, wherein the first extracting device divides the print data into a plurality of groups, each of which has a predetermined amount of the dot data, and extracts a part of the dot data included in each group.

3. A printing system according to claim 1, wherein the preview image forming device forms a first preview image by using the first part of the dot data, and forms a second preview image, a resolution of which is higher than the first preview image, by using the first part of the dot data and the second part of the dot data.

4. A printing system according to claim 1, wherein the preview image forming device forms a first preview image by using the first part of the dot data, and forms the second preview image, which is a magnification of the first preview image, by using the first part of the dot data and the second part of the dot data.

5. A printing system according to claim 1, wherein the data processing apparatus further comprises:

a measuring device for measuring velocity of a reception of the dot data from the printing apparatus; and a request command sending device for sending a request command to the printing apparatus if the measured velocity is slower than a predetermined velocity, and the printing apparatus further comprises:

a request command receiving device for receiving the request command from the data processing apparatus; and a second extracting device for extracting a second part of the dot data included in the print data in response to the received request command.

6. A printing system according to claim 1, wherein the print command data is described in a page description language.

7. A printing system according to claim 1, wherein the print data is bitmap data.

8. A preview image displaying method for a printing system comprising at least one data processing apparatus for generating data to form an image and a printing apparatus for printing the image, the data processing apparatus and the printing apparatus being connected with each other via a network, the preview image displaying method comprising the processes of:

sending the print command data generated by the data processing apparatus from the data processing apparatus to the printing apparatus, the print command data including a plurality of commands to form the image to be printed;

converting the print command data into print data in the printing apparatus, the print data including a plurality of the dot data each of which corresponds to a different dot of the image to be printed;

extracting a first part of the dot data included in the print data in the printing apparatus;

sending the extracted first part of the dot data from the printing apparatus to the data processing apparatus via the network;

receiving the first part of the dot data from the printing apparatus in the data processing apparatus;

forming a preview image by using the received first part of the dot data in the data processing apparatus;

displaying the preview image on a display device of the data processing apparatus;

sending a request command from the data processing apparatus to the printing apparatus, after the preview image is displayed;

extracting a second part of the dot data included in the print data in the printing apparatus, in response to the received request command;

sending the extracted second part of the dot data from the printing apparatus to the data processing apparatus via the network;

reforming the preview image by using the first part of the dot data and the second part of the dot data in the data processing apparatus; and displaying the reformed preview image on the display device of the data processing apparatus.

9. A preview image displaying method according to claim 8, wherein, in the extracting process, the print data is divided into a plurality of groups, each of which has a predetermined amount of the dot data, and a part of the dot data included in each group is extracted.

10. A preview image displaying method according to claim 8, further comprising the processes of:

measuring velocity of a reception of the first part of the dot data from the printing apparatus in the data processing apparatus when the first part of the dot data is received;

sending a request command from the data processing apparatus to the printing apparatus if the measured velocity is slower than a predetermined velocity;

extracting a second part of the dot data included in the print data in the printing apparatus, in response to the received request command;

sending the extracted second part of the dot data from the printing apparatus to the data processing apparatus via the network;

forming the preview image by using the second part of the dot data in the data processing apparatus; and displaying the preview image formed by using the second part of the dot data on the display device of the data processing apparatus.

11. A preview image displaying method according to claim 8, wherein the print command data is described in a page description language.

12. A preview image displaying method according to claim 8, wherein the print data is bitmap data.

13. A recording medium that stores a control program for controlling a printing system that includes at least one data processing apparatus for generating data to form an image and a printing apparatus for printing the image, the data processing apparatus and the printing apparatus being connected with each other via a network, the control program including instructions for:

sending the print command data generated by the data processing apparatus from the data processing apparatus to the printing apparatus, the print command data including a plurality of commands to form the image to be printed;

converting the print command data into print data in the printing apparatus, the print data including a plurality of the dot data each of which corresponds to a different dot of the image to be printed;

extracting a first part of the dot data included in the print data in the printing apparatus;

sending the extracted first part of the dot data from the printing apparatus to the data processing apparatus via the network;

receiving the first part of the dot data from the printing apparatus in the data processing apparatus;

forming a preview image by using the received first part of the dot data in the data processing apparatus;

displaying the preview image on a display device of the data processing apparatus;

sending a request command from the data processing apparatus to the printing apparatus, after the preview image is displayed;

extracting a second part of the dot data included in the print data in the printing apparatus, in response to the received request command;

sending the extracted second part of the dot data from the printing apparatus to the data processing apparatus via the network;

reforming the preview image by using the first part of the dot data and the second part of the dot data in the data processing apparatus; and displaying the reformed preview image on the display device of the data processing apparatus.

* * * * *